(12) United States Patent
Oshima et al.

(10) Patent No.: US 6,186,205 B1
(45) Date of Patent: Feb. 13, 2001

(54) PNEUMATIC TIRE FOR PASSENGER CARS INCLUDING SPECIFIED STEEL CORD

(75) Inventors: Kazuo Oshima; Kozo Sasaki; Tomohisa Nishikawa; Kazuomi Kobayashi; Kenji Matsuo, all of Tokyo (JP)

(73) Assignee: Bridgestone Corporation, Tokyo (JP)

(*) Notice: Under 35 U.S.C. 154(b), the term of this patent shall be extended for 0 days.

(21) Appl. No.: 09/193,721

(22) Filed: Nov. 17, 1998

(30) Foreign Application Priority Data

| Nov. 17, 1997 | (JP) | 9-315088 |
| Nov. 27, 1997 | (JP) | 9-326143 |
| Dec. 22, 1997 | (JP) | 9-353767 |
| Jun. 10, 1998 | (JP) | 10-162644 |
| Jun. 19, 1998 | (JP) | 10-172912 |

(51) Int. Cl.[7] .................. B60C 9/00; B60C 9/04; B60C 9/20; B60C 9/22; B60C 17/00

(52) U.S. Cl. .................. 152/517; 57/902; 152/527; 152/531; 152/553; 152/556

(58) Field of Search .................. 152/451, 517, 152/527, 556, 531, 553, 516; 57/902

(56) References Cited

FOREIGN PATENT DOCUMENTS

| 58-221703 | 12/1983 | (JP) . |
| 59-221708 | 12/1984 | (JP) . |
| 62-137202 | 6/1987 | (JP) . |
| 63-265704 | 11/1988 | (JP) . |
| 4-257384 | 9/1992 | (JP) . |
| WO 97/14566 | 4/1997 | (WO) . |

*Primary Examiner*—Adrienne C. Johnstone
(74) *Attorney, Agent, or Firm*—Sughrue, Mion, Zinn, Macpeak & Seas, PLLC

(57) ABSTRACT

A pneumatic tire for a passenger car having a pair of bead portions, a toroidal carcass portion extending over both bead portions, at least two belt layers provided in a crown portion of the carcass, a tread portion positioned at an outer peripheral side of the belt layer, and side wall portions provided at the right and left sides of the tread portion, and which further includes a steel cord as a reinforcing material for reinforcing at least one layer of the carcass portion and the belt layer. The steel cord is formed by plying a plurality of filaments each having a strand diameter of 0.125 to 0.275 mm, and has an inflection point on an S—S curve. A reduction rate of a diameter of the steel cord under a load stress which is one third of breaking strength in comparison with a no load condition is equal to or more than 20%.

14 Claims, 12 Drawing Sheets

F I G. 8
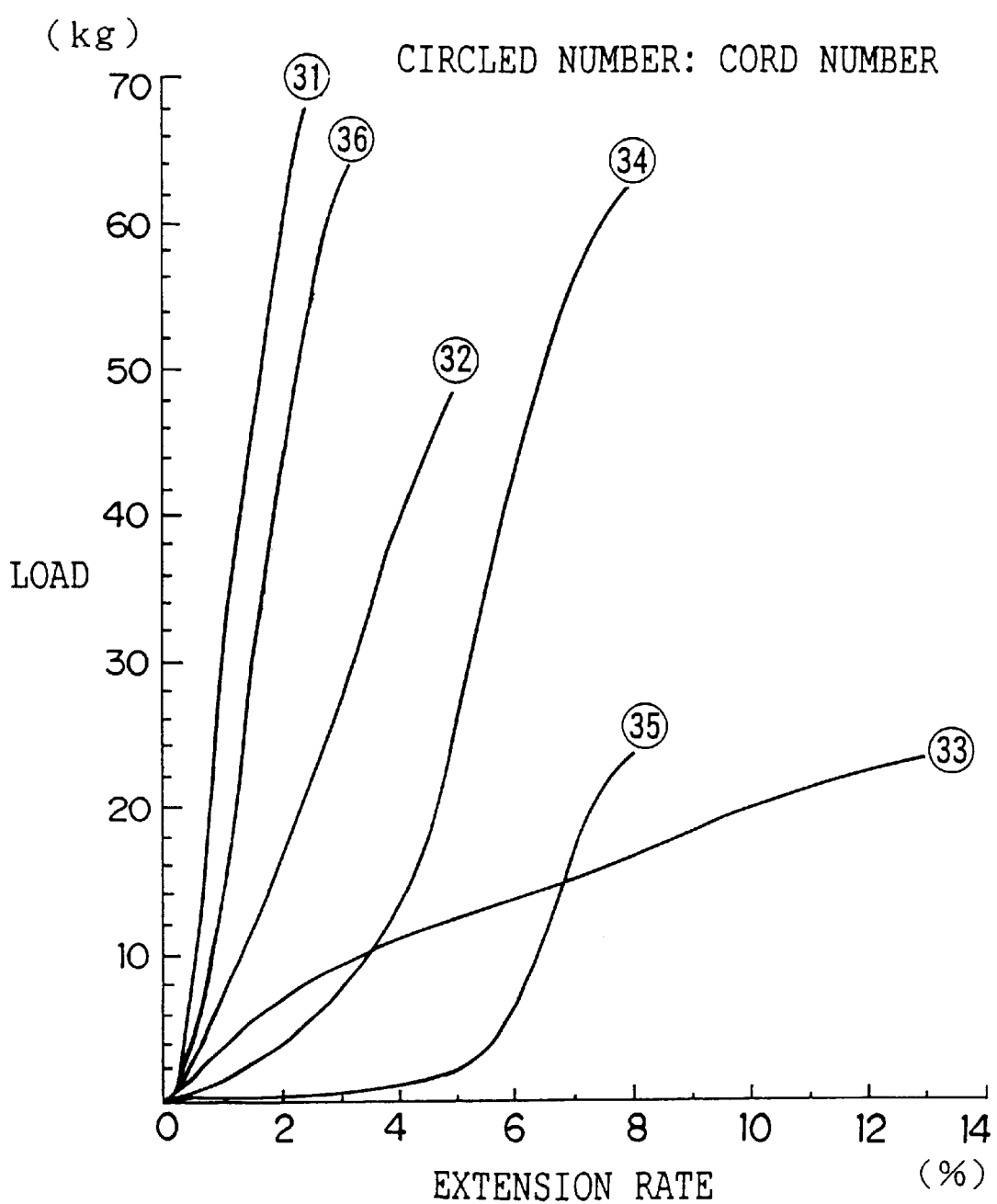

STRUCTURE IV

STRUCTURE VI

STRUCTURE V

STRUCTURE IV

STRUCTURE VI

STRUCTURE V

PNEUMATIC TIRE FOR PASSENGER CARS INCLUDING SPECIFIED STEEL CORD

BACKGROUND OF THE INVENTION

1. Field of the Invention

The present invention relates to a pneumatic tire, and more particularly to a pneumatic radial tire for passenger cars having excellent riding comfort and stick slip resistance and capable of good run flat running even when the internal pressure is lowered.

2. Description of the Related Art

In the case of a relatively small radial tire such as a radial tire for passenger cars, an organic fiber such as a polyester, rayon and the like are generally used for a carcass ply material, and steel cord is used for the belt portion. Since suitable riding comfort is required in a tire for passenger cars, the steel cord used for the carcass ply material of tires for trucks and buses is not frequently used as a reinforcing material of the carcass ply of tires for passenger cars.

However, in recent years, it has been suggested that the steel cord be applied to the carcass ply of a radial tire of a relatively compact size.

For example, in Japanese Patent Application Laid-Open No. 62-137,202, a steel cord ply having a single layer construction with a filament diameter of 0.15 to 0.25 mm is described. However, in this example, improvement in riding comfort is still left unsolved, and since a stick slip phenomenon (a phenomenon in which the grip force of a tire is suddenly lowered when the angle of the steering wheel reaches a certain limit when suddenly turning the steering wheel while running, causing a side slip) is observed although so-called "(steering)stability" while (during) normal operation is improved, there still remains major problems in practical use.

Further, in Japanese Patent Application Laid-Open No. 63-265,704, there is described a steel ply cord in which flexural rigidity is lowered by setting the number of cord strands to between two to four and setting the diameter of the strands to between 0.15 to 0.21 mm. However, tensile stress at a specific extension (hereinafter, often referred to as a modulus) is high, compression fatigue problems have not been improved, and stick slip resistance performance is slightly improved but is far behind the level achieved by organic fiber.

Still further, in Japanese Patent Application Laid-Open No. 4-257,384, there is suggested a cord structure which guarantees the open characteristics of a 1×3 structure, however, even in this case, a riding comfort comparable to the level achieved by organic fiber is not reliably ensured, and the stick slip resistance performance is far behind the level of organic fiber.

Furthermore, in WO 97/14,566, it is suggested that a steel cord whose strength is improved be used for the ply cord. However, in this case, there is no consideration of flexural rigidity or compression rigidity of the cord although the weight of the cord is slightly reduced due to the use of a high strength steel material, therefore the stick slip performance mentioned above is likely to still remain a great problem. In addition, cord fatigue remains a major problem in view of guaranteeing safety.

In addition, in Japanese Patent Application Laid-Open No. 59-221,708, there is suggested a so-called strand ply cord construction using strands each having a strand diameter of 0.08 to 0.16 mm, and in Japanese Patent Application Laid-Open No. 1-30,803, there is suggested a 1+(1×n) construction, and in Japanese Patent Application Laid-Open No. 58-221,703, there is suggested a 3×3 strand construction and the like. However, the improvement achieved by these constructions is still far from overcoming the above-described disadvantages of the steel ply cord.

When using a steel cord for the carcass ply, the grip force of the tire is reduced for the following reasons. In general, if an organic cord is used as the carcass ply cord, when a great torsional deformation is generated in the tire, the belt layer undergoes a so-called bias deformation and absorbs the deformation by changing the angles of the reinforcing cord of a belt layer (hereinafter, the reinforcing cord will frequently be referred to as a belt cord). However, when the carcass ply cord is made of steel, since all three lines of a triangle formed by the two belt cords and a carcass ply cord are the steel cord which undergoes almost no compression, the bias deformation of the belt is restricted. That is, the torsional deformation of the tire can no longer be fully absorbed by the deformation of the belt portion, causing the tire tread surface to unavoidably float up from the road surface. As a result, the tire tread surface loses its grip of the road surface.

Accordingly, when the steering wheel is turned to more than a certain steering angle, the tire cannot withstand the deformation caused by such a wide steering angle, and the ply cord suddenly buckles and deforms, so that the type grip of the road surface is lost, causing a so-called stick slip phenomenon. This gives a great risk to the safety of the car and causes a lost of steering wheel stability when the steering wheel is suddenly turned in an emergency.

On the other hand, there is a disadvantage in the organic fiber (a polyester, a rayon, a nylon and the like mentioned above) having a low modulus (that is, a low tensile stress at a specific extension), which is generally used as the reinforcing material (a ply cord) of a carcass ply for a compact size tire having a relatively low internal pressure. Such types having a relatively low internal pressure are generally used for passenger cars or light trucks or the like. In the case of polyester, since the modulus is lowered under the high temperature when the tire is vulcanized, a so-called post cure inflation (hereinafter, referred to as a PCI) is required after the tire vulcanization process, therefore the productivity of the tire is deteriorated. Further, there are some concerns in the bonding between the cord and the matrix rubber composition, and decrease in the modulus of the cord due to the heat generated at high speed, so that the steering stability or durability of the tire may be deteriorated.

In the case of rayon, it is considered that the PCI is not required since the modulus is not lowered as much at the high temperature. However, since pulp is used for the raw material, there is a demand to replace the raw material with something else. Further, since sulfuric acid is used in the manufacturing process thereof, there might also be the problem of environmental pollution. Finally, as for nylon, since nylon is far behind in terms of the modulus compared to polyester and rayon, there is the disadvantage that the control stability is poor although it gives relatively good riding comfort. In addition, the PCI is indispensable in case of nylon.

Further, organic fibers of this kind require a bonding treatment (hereinafter, referred to as a dip treatment) for obtaining adhesion to the matrix rubber composition.

Still further, organic fiber causes a problem when it is used for a run flat tire developed in recent years and structured such that safe running can be ensured even when the tire is punctured.

When run flat tire is used, the user is able to safely move the vehicle to a place where the tire can be replaced even when the tire is punctured, and from the view point of the vehicle producer, since it is not necessary to mount a conventional spare tire on the vehicle, merits such as a wider space in the vehicle, reduced vehicle weight and the like can be obtained.

However, in the case of the run flat tire, since the tire runs in a state in which the internal pressure of the tire is lower, it has to experience a considerable amount of a distortion and deformation. Therefore, a high level of heat resistance is required for the tire such that it can overcome severe problems like melting of the rubber or even the cord, due to heat generated by the distortion and deformation of the tire.

In order to secure such heat resistance at a temperature equal to or more than 200° C., not only the heat generation of the rubber needs to be restricted but also the heat resistance of the cord and that of the adhesion between matrix rubber composition and the cord must be improved. However, in the organic fiber generally used for the tire cord, there has been the disadvantage that the heat resistance of the cord itself or that of the adhesion between the matrix rubber composition and the cord is insufficient. When a steel cord is used in place of organic fiber, this particular disadvantage is improved, however, the other disadvantages inherent to the steel cord mentioned above are then caused.

In summary, since the steel cord has a higher tensile modulus and a higher compression modulus and thus is harder than normal organic fiber, a lot of advantages such as an improvement of strength, an improvement in heat resistance, and the like are achieved when the steel cord is used for the carcass ply cord of a radial tire having relatively low internal pressure and having a relatively compact size such as the tire for passenger cars and the like. However, on the other hand, the reduction in riding comfort, the increase in the tire weight, and the stick slip phenomenon caused by the belt rigidity being too high are generated. These give a great concern for the safety of the vehicle and could be a cause for losing the steering stability if the steering wheel is suddenly turned in an emergency.

On the other hand, when organic fiber is used instead of steel cord for the carcass ply cord material of the compact tire, there have been disadvantages in view of the productivity of the tire and the like.

SUMMARY OF THE INVENTION

Accordingly, in view of the facts mentioned above, when a steel cord is used for the carcass ply cord of a tire used in a relatively low internal pressure state such as the tire for a passenger car, it is necessary to overcome various kinds of problems in order to make the best use of the advantages of the steel cord and overcome the various kinds of disadvantages mentioned above.

At first, in order to improve riding comfort, it is necessary to reduce belt rigidity, particularly the bending rigidity of the belt such that an increase in the rigidity of the belt portion due to the steel ply cord can be restrained. Further, in order to improve stick slip performance, it is necessary to reduce the rigidity (particularly the bending rigidity) of a tire tread, that is, of the belt portion, such that the tire tread can be easily deformed so as to be able to keep contact with the road surface under various kinds of conditions.

In summary, it is an object of the present invention to provide a pneumatic tire having excellent riding comfort and stick slip resistance while maintaining a high level of durability and steering stability.

The inventors have paid particular attention to the steel cord so as to solve the problems mentioned above. As a result of keen consideration, they have discovered that the object mentioned above can be achieved by, for example, using a specific steel cord as a reinforcing material for at least one layer of reinforcing layers as mentioned below. The present invention has been completed on the basis of this discovery.

The pneumatic tire for a passenger car of the present invention comprises a pair of bead portions, a toroidal carcass layer (carcass ply) extending over both bead portions, at least two belt layers provided in a crown portion of the carcass, a tread portion positioned at an outer peripheral side of the belt layer, side wall portions provided at the right and left sides of the tread portion, and a steel cord serving as a reinforcing material for reinforcing at least one reinforcing layer.

A down carcass may further disposed, preferably, outside the turned up carcass.

The reinforcing layer which is reinforced by the specific steel cord comprises the specific steel cord and a matrix rubber composition, and includes carcass layer, belt layer, belt reinforcing layer, and at least one layer of either belt portion or carcass portion being reinforced by this steel cord is preferable. And more preferably, the specific steel cord is used at least one layer of carcass portion.

It is desirable that the pneumatic tire for the passenger cars of the present invention is obtained by a process which does not include a post cure inflation process during the tire manufacturing process.

In accordance with the first aspect of the present invention, a specific steel cord is used as a reinforcing cord of at least one layer of the carcass portion (hereinafter, often referred to as a ply cord.)

More specifically, in accordance with the first embodiment of the present invention, at least one layer of the carcass portion is reinforced with the specific steel cord, wherein the steel cord is formed by plying a plurality of filaments each having a filament diameter of 0.125 to 0.275 mm, has an inflection point on an S—S curve of the cord within a range of over 1% of extension ratio, and has a cord diameter reduction rate of equal to or more than 20%.

It is desirable that the above-described steel cord diameter reduction rate is equal to or more than 30%, and it is further desirable that it is equal to or more than 45%.

Further, at least one belt reinforcing layer may be disposed. The belt reinforcing layer may also include the steel cord.

It is desirable that the construction of the steel cord is a single layer construction of 1×n (2≦n≦7). It is desirable that the steel cord is used as a reinforcing material in the carcass layer.

Further, in accordance with a second aspect of the present invention, at least one layer of the carcass portion of a tire for passenger cars is reinforced by a steel cord having a 1×3 structure, and the ductility before breaking of the steel cord is equal to or more than 3.5%, and the strand diameter of the filament constituting the steel cord is 0.125 to 0.275 mm.

It is desirable that the steel cord is a cord having an inflection point within a range of over 1% of extension ratio on an S—S curve thereof. Further, it is desirable to have at least one belt reinforcing layer formed by being wound outside the belt layer in a spiral and endless manner so as to be substantially in parallel to a tire peripheral direction, and the belt reinforcing layer disposed across the entire belt layer and/or at both end portions of the belt layer.

The inventors have particular paid attention to the belt layer cord so as to solve the problems mentioned above. As a result of keen consideration, they have discovered that the object mentioned above can be achieved by using organic fiber cord or a specific steel cord for at least one of the belt layers in order to reduce the flexural rigidity of the belt portion. The present invention has been completed on the basis of this discovery.

More specifically, in accordance with a third aspect of the present invention, the cord of at least one carcass layer is made of steel and at least one of the belt layers comprises an organic fiber cord, or a steel cord. The steel cord is formed by plying a plurality of filaments each having a diameter of 0.125 to 0.275 mm, and has an inflection point on an S—S curve of the cord within a range of over 1% of extension rate and a diameter reduction rate of equal to or more than 35%.

It is desirable that the organic fiber cord is a polyester cord or an aramid cord.

In addition, a belt reinforcing layer may be disposed.

Further, the inventors have specifically considered a motion of the carcass ply at a time of a run flat running. As a result, they have discovered that a pneumatic tire for passenger cars having an excellent durability can be provided by using a specific steel cord as a reinforcing cord and further by disposing a composite comprising a filament fiber and matrix rubber composition in the side wall. In this pneumatic tire, the rolling resistance of the tire can be lowered. The present invention has been completed on the basis of this discovery.

More specifically, in accordance with a fourth aspect of the present invention, there is provided a run flat tire, wherein at least one carcass ply is reinforced by a steel cord having a 1×n construction (here, n is a natural number of 2 to 7), the diameter of the steel cord filament is 0.125 to 0.275 mm. The steel cord further has a feature either; the S—S curve of the steel cord has an inflection point within a range of over 1% of extension and a diameter reduction rate of 35% or more, or the ductility before breaking of the steel cord taken out from the tire is 3.5% or more.

A rubber reinforcing layer having a cross section formed in a crescent shape is further disposed inside the carcass ply layer in the side wall portion. Further, at least one rubber filament fiber composite having a thickness of 0.05 to 2.0 mm, which comprises a filament fiber having a diameter or a maximum diameter of 0.0001 to 0.1 mm and a length of 8 mm or more and a rubber component, is disposed inside the rubber reinforcing layer.

It is desirable that the filament fiber is 4 to 50% by weight of the rubber and filament fiber composite. It is also desirable that the rubber and filament fiber composite is constituted by a non woven fabric having a weight per 1 $m^2$ of 10 to 300 $g/m^2$ and matrix rubber composition.

BRIEF DESCRIPTION OF THE DRAWINGS

FIG. 8 is a graph which shows an S—S curve of a steel cord in an example of the third embodiment and corresponding comparative examples.

DESCRIPTION OF THE PREFERRED EXAMPLES

Figure 1:
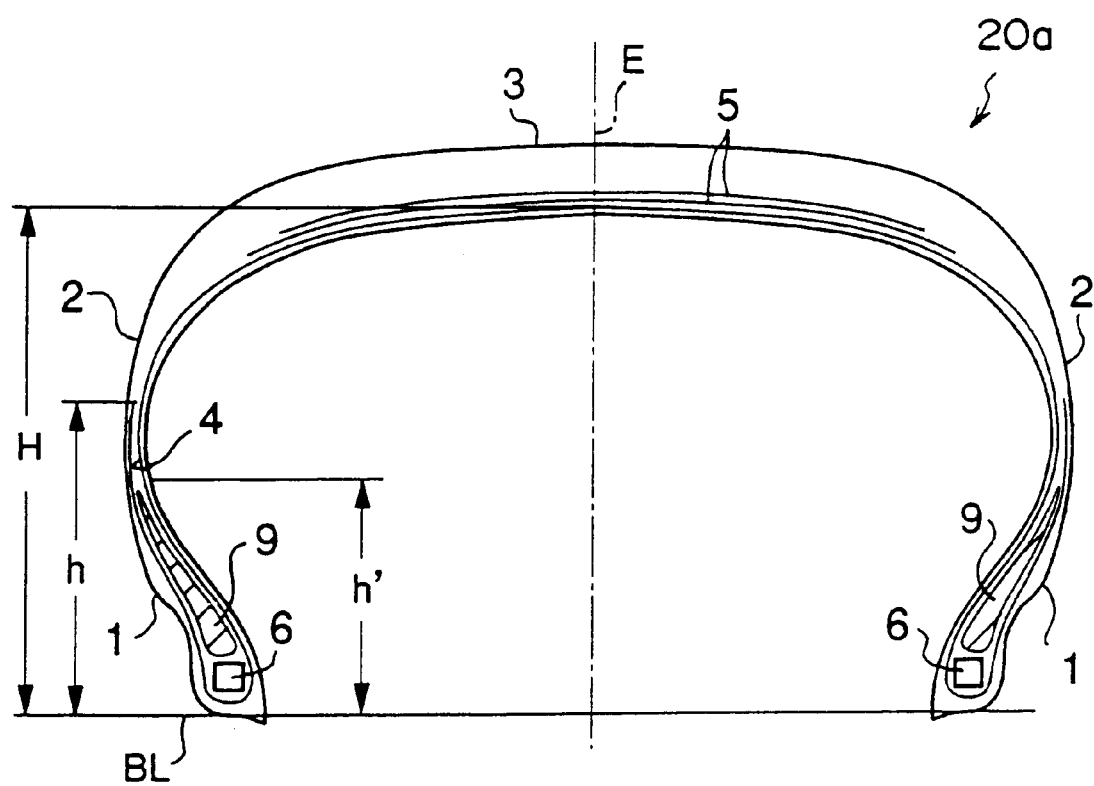
FIG. 1 is a schematic cross sectional view of a pneumatic tire for a passenger car in accordance with the present invention in which a specific steel cord is used for at least one of the reinforcing layer.

Each embodiment will be explained briefly and then described in detail with reference to the experimental examples. However, the invention is not limited to these examples as far as the modifications are within the scope of the present invention.

The material of the specific steel cord is not particularly limited and any kinds from a so-called normal strength cord having a tensile strength of about 300 $kgf/cm^2$ to a so-called ultra high tensile strength cord having a tensile strength of 400 $kgf/cm^2$ or more can be used.

The specific steel cord is obtained by controlling some of the characteristics of the cord, such as filament diameter, ductility before breaking, construction, reduction rate of the cord diameter, shape of the stress-strain curve (S—S curve).

The reduction rate of cord diameter here means a rate of a cord diameter under a load one third of the load at breaking ($d_b$) to the cord diameter under no load stress ($d_0$).

Reduction rate of diameter=$[d_b/d_0] \times 100(\%)$

In the case of a normal steel cord, the ductility before breaking is about 2% in both the cord and the filament, however, in the present embodiment, it is preferable that the ductility before breaking of the cord is larger than that. This can be achieved by enlarging the ductility before breaking of the filament. For this reason, the filament having a ductility before breaking equal to or more than 5%, and preferably equal to or more than 6% is provided. The filament having a ductility before breaking equal to or more than 5% can be obtained by increasing the magnitude of formation applied to the normal ply cord. However a method other than the means for increasing the magnitude of formation can be employed. The filament which has been provided with a high ductility before breaking in this way can deform in a relatively free manner when receiving the compression or extension distortion stress within the cord. Accordingly, the buckling of the cord due to the compression deformation is not caused as in the conventional steel cord, the filament can absorb the distortion at the time of the compression deformation by the deformation of the curvature of the filament itself, and the compression modulus of the cord can be significantly reduced. Therefore, the fatigue resistance can be widely improved. And the stick slip phenomenon can be eliminated since the buckling found in the conventional steel cord is not generated.

As described above, the filament has the capability of moving in a relatively free manner, however, when the extension stress is applied, the filament loses the freely movable surplus space, and enters the material deformation stage, which will result in the cord breakage relatively soon. So the reduction rate of the diameter should be kept more than certain value.

The extension and compression characteristic of the steel cord can be optionally changed by suitably adjusting the magnitude of forming of the filament. Generally, the more the magnitude of forming, that is, the greater the diameter of the cord, the better the fatigue resistance of the cord. However, when the magnitude of forming of the filament is too large, the diameter of the cord itself becomes too big, thus in the case of a tire having a relatively thin tire side portion such as tires for a passenger car, an unevenness is generated in the side appearance or it may be necessary to increase the thickness of the rubber gauge. In order to avoid such a nuisance, the diameter of the cord has to be limited. In short, it is preferable that the ductility before breaking of the cord is within 15%, preferably within 10%, and more preferably within 8%.

And it is considered that the reinforcing cord in the tire receives only about 10% of the stress at breaking, the specific steel cord used in the present invention, which can easily extended particularly under a low stress, and has an initial extension modulus similar to that of nylon or a polyester, will provide an improved riding comfort property to the tire.

Further, the special steel cord mentioned above is characterized by absorbing the distortion deformation by the deformation of the curvature of the filament at the beginning of the deformation. The cord of this kind generates the stress due to the deformation of curvature of the filament at the beginning of the extension deformation (hereinafter referred to as a curvature deformation area), and when the filaments are brought into contact with each other such that the deformation thereof does not progress any more, the material itself of the filament finally deforms (hereinafter referred to as a deformation area. Accordingly, the effect of the tensile stress in the curvature deformation area and that in the material deformation area are, needless to say, different. The S—S curve at a time of extending the cord indicates the inflection point within a range of over 1% of extension rate, and a high modulus observed in the normal steel cord is not indicated at the beginning of the tensile deformation.

As previously mentioned, a tire for a passenger car is structured such that the internal pressure thereof is relatively low and the tension applied to the ply cord is about 10% of the cord cutting stress. Accordingly, under a stress within a certain range to which a cord in a tire is normally subjected, since the steel cord used in the present embodiment has a low modulus deformation area in the beginning of the extension deformation, the poor riding comfort due to a high modulus which is a disadvantage of the conventional steel cord can be prevented, and the fatigue resistance and the stick slip resistance can also be widely improved.

Since the steel cord in accordance with the present invention hardly changes its physical properties even at high temperatures in comparison with polyester and nylon which have been mainly used for the ply cord of passenger car tires in the conventional art, and does not shrink due to heat, the conventional PCI is not required and the process for manufacturing the tire can be shortened.

Further, since the bonding hardly deteriorates due to high temperature, there is the advantage of easily improving the high speed durability of the tire. Also, since the cord strength and the adhesive property are sufficient even at a high temperature equal to or more than 200° C., it can sufficiently function as the ply cord for a run flat tire.

Basically, the constructions of the cord is not particularly limited and may have any kinds of constructions as long as the cord satisfies the feature described above. The construction can be a single layer such as 1×n (n: 2 to 7) and the like, and a layered construction such as 1+n (n: 2 to 8), 2+n (n: 5 to 11), 3+n (n: 6 to 12), 1+n+m (n: 5 to 8, m: 1 to 15), 2+n+m (n: 5 to 11, m: 1 to 17), 3+n+m (n: 6 to 12, m: 1 to 18) and the like. Among these the single layer construction such as 1×n (n: 2 to 7) and the like is preferable. The filament maybe straight or plied. A spiral filament may be used.

Further, the pneumatic tire of the present invention may have at least one belt reinforcing layer, formed by being wound outside the belt layer in a spiral and endless manner so as to be substantially in parallel to the tire peripheral direction, and the belt reinforcing layer is disposed along the entire length of the belt layer(as "a cap") and/or at both end portions (as "a layer") of the belt layer.

The pneumatic tire may be structured as a run flat tire which may, further, have a reinforcing rubber layer which has a cross section formed in a crescent shape provided on an inner peripheral surface of the carcass layer in the side wall.

The rubber component used for the present invention is not particularly limited and any kind of rubber may be used. Preferably, the rubber component is natural rubber or a diene synthetic rubber. As the diene synthetic rubber, styrene-butadiene rubber (SBR), butadiene rubber (BR), isoprene rubber (IR) are preferable. The rubber component is used by itself or in combination of two or more kinds.

After preparing each member of the tire by conventional method, they are assembled together and vulcanized by a conventional method to obtain the pneumatic tires of the present invention.

When the test tires were prepared, the cord counts were adjusted so as to make the tire cord strength substantially the same as that of the control tire and eliminate any influence of the counts.

The tire total strength is calculated by the following equation.

[The tire total strength]=(the count of the cord at the center or the crown portion)×[strength of the cord taken out of the tire][kgf/ 5cm]

The tensile stress at a specific elongation of the rubber composition used in the present invention is measured in accordance with the Japanese Industrial Standard (JIS) K6301-1995. In addition, the hardness of the rubber composition used in the present invention is measured in accordance with the Japanese Industrial Standard (JIS).

Various kinds of evaluation methods employed in these examples, were as follows.

(1) Steel Cord Tensile Test

A steel cord was taken out of a spool without applying any excess stress on it. The steel cord was then subject to a test according to JIS G3510-1992 in which an initial load of 50 g was applied at a grip interval of 250 mm. Then, the maximum load and the magnitude of the extension required to cut (break) the test piece was measured at a tensional speed of 25 mm/min, to calculate the values of the cutting load and the total magnitude of the extension at the time of cutting.

The magnitude of total extension was calculated by the following formula

Total extension at cutting (%)=(E/L)×100 wherein E: The change in the length between the grips of extended sample at the time of cutting (mm), L: initial grip interval (mm).

Further, the S—S curve was drawn by a load-extension automatic recording apparatus.

(2) Steel Filament Tensile Test

A steel cord was taken out of a spool without applying any excess stress on it. Then, filaments were taken out of the steel cord without applying any excess stress on them. The maximum load and the magnitude of the extension required to cut the test piece was measured in the same manner as in test (1) to calculate the values of the cutting load and the total magnitude of extension at the time of cutting.

(3) Cord Compression Fatigue Resistance

The cord to be tested was inserted into a cylindrical rubber sample so that the longitudinal direction of the cylinder corresponded to the axial direction of the cord. Then, compression stress was applied repeatedly to the axial direction of the cord, and the number of application of the compression required for cutting was counted.

(4) Pitch Length and Magnitude of Forming

Figure 5:
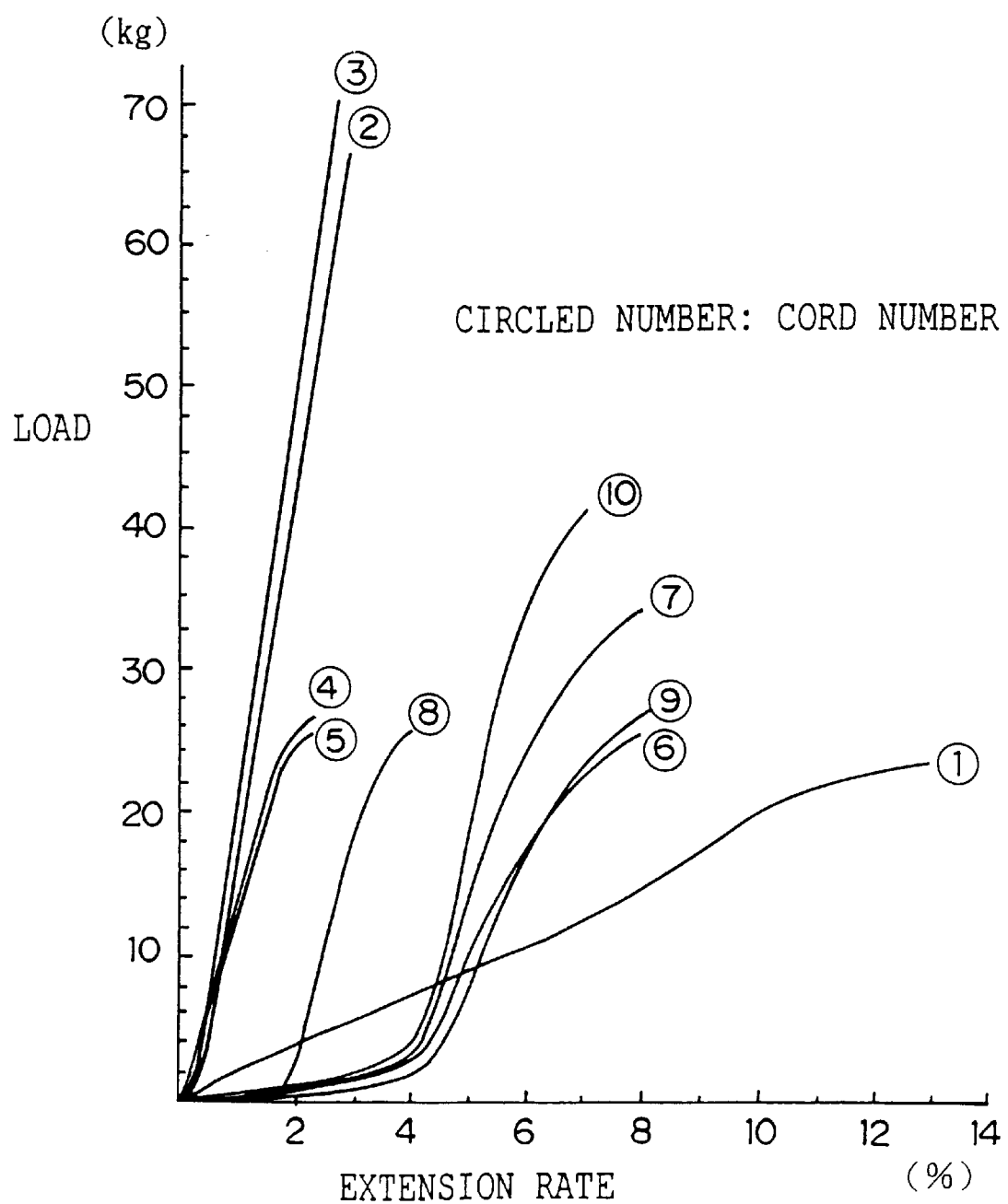
FIG. 5 is a graph which shows an S—S curve of a steel cord in an example of the first embodiment and corresponding comparative examples.
Figure 6:
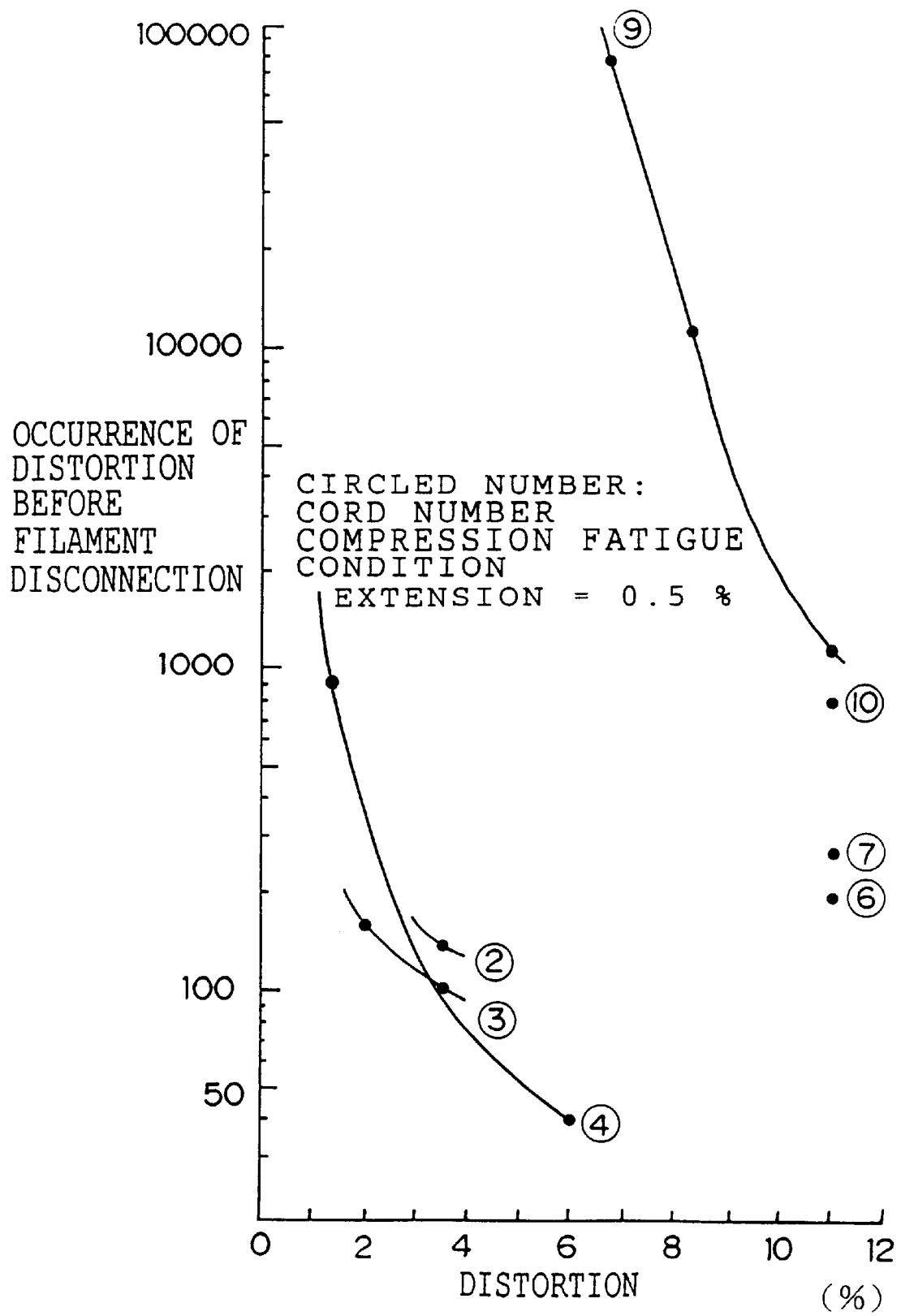
FIG. 6 is a graph which shows a compression fatigue characteristic of the steel cord in a representative example of the first embodiment and corresponding comparative examples.

A steel cord was taken out of a spool without applying any excess stress on it. Then, filaments were taken out of the steel cord without applying any excess stress on the filament. The filaments, which had been made to have a wave-like shape, were straightened without applying any excess tension. The pitch length and the magnitude of formation as shown in FIG. 5 were measured under a magnifying glasses.

(5) Drum Durability

The tires to be tested whose internal pressure had been set at the maximum air pressure of JATMA were left in a room at a temperature of 25° C.±2° C. for 24 hours. Then, the internal pressure was adjusted to the maximum air pressure. The tires were pressed onto a drum rotating at a peripheral speed of 60 km/h under the load twice the maximum load capacity of JATMA, and were rotated. The running distance achieved before the occurrence of trouble was expressed by an index wherein the value obtained from the tire of the comparative example 1 was set at 100. This index represents drum durability. The higher the number, the better the durability. These are appropriate test conditions for evaluating the durability of a bead portion.

(6) Stick Slip Characteristic Using Actual Cars (Stick Slip Resistance)

"Stick slip" is a phenomenon where, if the steering wheel is turned to the extent that the tires squeal, then the tires suddenly cease to grip the road when the wheel is turned to a particular angle greater than a particular angle and there is no response when the wheel is turned further. According to the employed testing method, an internal pressure of 2.0 kg/cm$^2$ was applied to the tire, the tires to be evaluated were mounted to the four wheels of a sedan type passenger car of 2000 cc size, the car was then run straight at a speed of 80 km/h or more, and the steering wheel was turned to the extent that the tires began to squeal. Whether or not the tire grip force was suddenly lost at a certain steering angle and a response from the steering wheel was lost at that point was tested (a feeling test). The actual car stick slip characteristic "OBSERVED" shows that the stick slip resistance was not good, and the actual car stick slip characteristic "NONE" shows that the stick slip resistance was good.

(7) Reduction Rate of Cord Diameter

A steel cord was taken out of a spool without applying any excess stress on it. The code diameter was measured by a projection method using a microscope. Then, load was applied to the cord and the cord diameter was measured using the same projection method. A ratio (cord diameter under a load being one third of the tensile stress at breaking of each cord/cord diameter under no load) was calculated and expressed as a percentage.

(8) Run Flat Durability

A rim was assembled under an internal pressure 3.0 kg/cm$^2$ and was left in a room temperature 38° C. for 24 hours. Thereafter, a core of the valve was pulled out so as to set the internal pressure at 1 kg/cm$^2$(at the atmospheric pressure). A drum running test was performed under a condition of a load 570 kg, a speed 89 km/h and a room temperature 38° C. A running distance achieved before any trouble was observed was defined as a run flat durability, and was expressed by an index in which the value obtained in the comparative example 1 was set to be 100. The greater the index, the better the run flat performance. Durability at a time of charging internal pressure (Durability of the tire in a normal running for the tires of the fourth embodiment)

A rim was assembled under an internal pressure 3.0 kg/cm$^2$ and was left in a room temperature 25° C. for 24 hours. Thereafter, the internal pressure was again adjusted at 3.0 kg/cm$^2$. The tire was pressed onto the drum rotating at a peripheral speed of 60 km/h under a load twice as much as the JATMA maximum load capacity, and a running distance achieved before any trouble was observed was measured. In estimating a utility of the tire, a case equal to or less than 20000 km was supposed to be marked by x, and a case more than 20000 km was supposed to be marked by ○.

Ductility of a cord taken out of a tire

The steel cord is taken out of the tire and all the matrix rubber composition was carefully removed. The ductility of the cord was measured in a same manner as in a case of a raw cord.

Firstly, a pneumatic tire for a passenger car according to a first aspect of the present invention will be described below.

In the embodiments of this aspect, the specific steel cord is used as a reinforcing material for reinforcing at least one layer of a carcass layer of the pneumatic tire for the passenger cars.

It is necessary that the specific steel cord used in the present invention has a modulus (tensile stress experienced at a predetermined amount of extension) lower than that of ordinary steel cord. However, the ductility at the time of cutting (hereinafter referred as "ductility before breaking") thereof is required to be higher than that of aromatic polyamide, and also the initial modulus thereof is required to be lower than that of aromatic polyamide.

This kind of characteristic can not be obtained by a normal steel cord. However, after contemplating the possibility that a low modulus and a great ductility before breaking is obtained by providing a very large forming to a filament, it has been discovered that the desired steel cord having a high ductility before breaking and a low modulus can be obtained by setting a large amount of forming in comparison with the pitch length of the filament.

Further, as a result of considering the compression modulus and compression fatigue resistance required for a ply cord of a tire for a passenger car, the following findings were obtained. More specifically, when the conventional steel cord is compressed, a buckling is generated in a portion where a cord exists even by a quite small compression input equal to or less than 1%, and when a compression input equal to or more than the above input is further applied, the buckling portion substantially absorbs such a newly applied compression distortion input. As a result, fatigue occurs only in the buckling portion. That is, the buckling, generated at a time of the compression deformation in this manner, significantly increases the compression modulus of the cord itself under the low compression distortion input until the bucking is generated, as well as lowers the fatigue resistance of the cord.

There was also discovered the possibility that the compression input could be absorbed by enlarging the curvature of the filament, and thus reducing the compression modulus and widely improving the fatigue resistance even in the steel cord. With this improvement, a significant improvement of the fatigue resistance which has been a disadvantage of a steel ply and elimination of the stick slip may also be possible. In short, an effect of improving the fatigue resistance, which is far more excellent than that obtained by the conventional narrowing of the filament diameter can be achieved, by absorbing the distortion input of the cord with a deformation of the filament itself. Here, since the cord buckling is not generated, a compression modulus in a level equal to an organic fiber can be obtained.

In the steel cord used as the reinforcing material in this embodiment, the feature thereof is, as mentioned above, summarized as "the distortion input applied to the cord is absorbed by the deformation of the curvature of the filament".

The reduction rate of the diameter of the cord should be 20% or more, and is preferably 30% or more, and more preferably 45% or more for sufficiently securing the fatigue resistance of the cord.

Further, since a cord constituted by such filaments which has a high ductility before breaking can absorb the distortion by the deformation of the curvature of the filament itself even when receiving the tensile deformation input, the initial modulus can be widely reduced in comparison with the conventional steel cord. It is, as mentioned above, considered that the ply cord in the tire receives only about 10% of the cut strength, and the riding comfort of the tire can be improved.

Further, the diameter of the filament of the steel cord is 0.125 to 0.275 mm, and preferably 0.125 to 0.230 mm. When the diameter is less than 0.125 mm, it is hard to extend the wire at a time of manufacture (this means that a sufficient tensile strength may not be obtained), and the cord strength is lowered, resulting in a reduced strength of the case member of the tire. When it is over 0.275 mm, the fatigue resistance is deteriorated and the cord diameter becomes too thick. Accordingly, these extreme cases are not preferable.

In this case, the steel cord in the present embodiment is used as a reinforcing material for at least one layer of the carcass layer.

Further, it is preferable that the cord having the feature mentioned above maintains the feature thereof in the tire.

Further, the pneumatic tire of the present invention may have at least one belt reinforcing layer.

The structure of the pneumatic tire for the passenger cars of the present invention will be described below with reference to the drawings.

Figure 2:
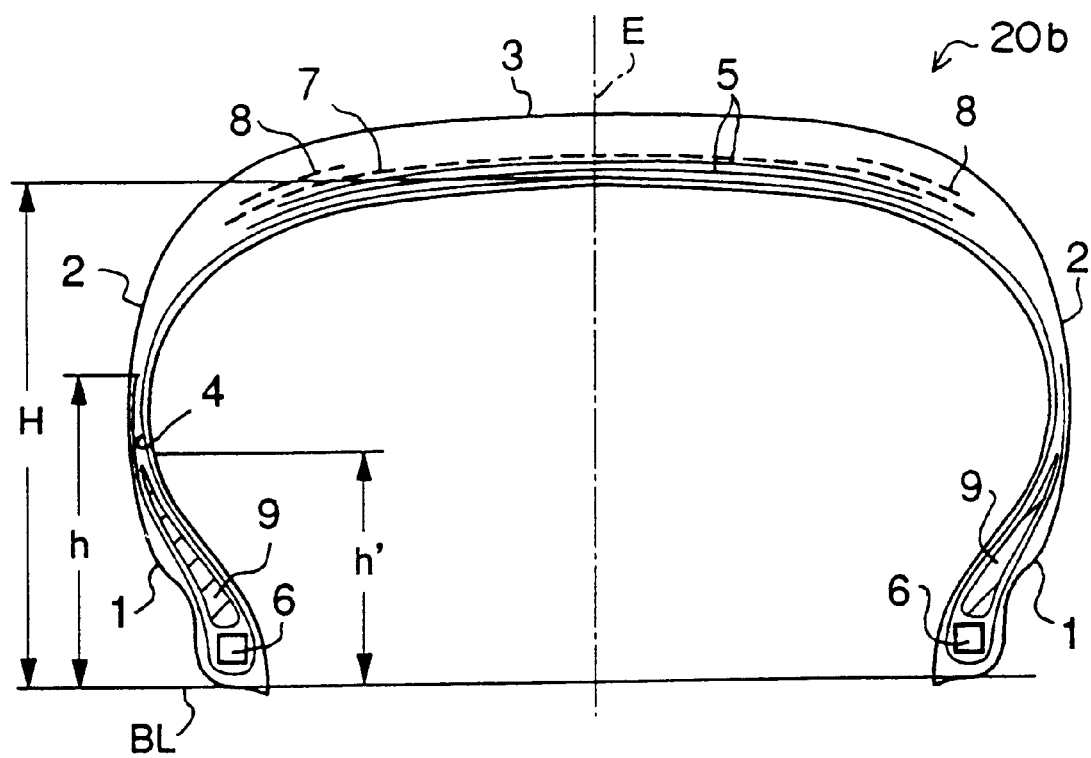
FIG. 2 is a schematic cross sectional view which shows a modified example of the pneumatic tire for a passenger car shown in FIG. 1.
Figure 3:
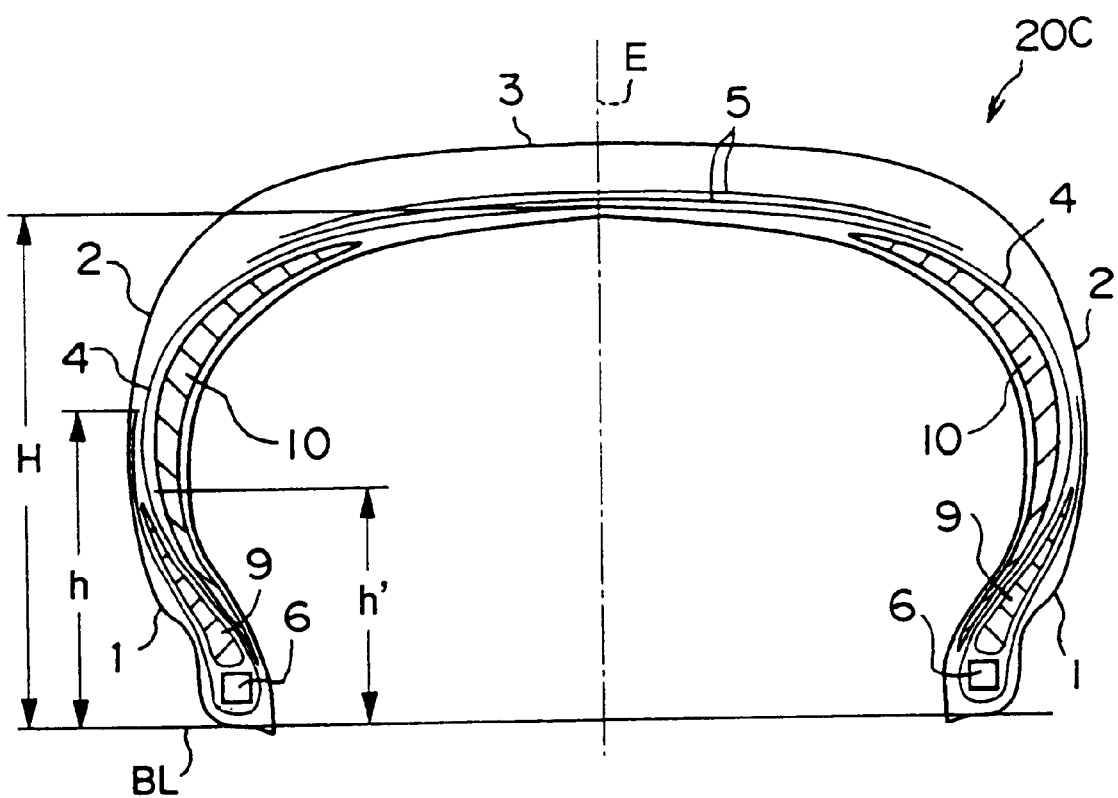
FIG. 3 is a schematic cross sectional view of a run flat tire corresponding to another modified example of the pneumatic tire for a passenger car shown in FIG. 1.

Schematic cross sectional views of the pneumatic tire for a passenger car in accordance with the present embodiment are exemplified in FIGS. 1, 2 and 3.

A pneumatic tire 20a in FIG. 1 is structured such that both ends of a carcass ply 4, using steel cords whose cord direction runs in the radial direction of the tire, are bent around a pair of right and left bead wires 6, a height h of a bent portion is 60% a height H of the carcass ply 4, a height h' of a bead filler rubber 9 is 50% of H, two layers of steel belts 5 are disposed outside the carcass ply 4 in the radial direction of the tire in a ring configuration, and a tread rubber 3 is disposed in a tire road contacting surface portion above the steal belts 5. Further, a side wall portion 2 and a bead portion 1 are arranged on the carcass layer on both sides of the tread rubber 3.

The pneumatic tire 20b in FIG. 2 is structured such that two sheets of belt reinforcing layers 7 (cap) and 8 (layer) are disposed on an outer periphery side of the steel belt 5. Members other than this are the same as in FIG. 1.

A pneumatic run flat tire 20c in FIG. 3 is structured such that the reinforcing rubber layer 10 having a crescent shaped cross section (for example, rubber having a maximum thickness of 13 mm and a hardness of 80 degrees) for sharing and supporting a load is arranged on an inner peripheral surface of the carcass ply 4 in the side wall portion 2. Members other than this are the same as for FIG. 1. Or this tire may also have a belt reinforcing layer as shown in FIG. 2.

(Explanation of Cord)

Figure 4:
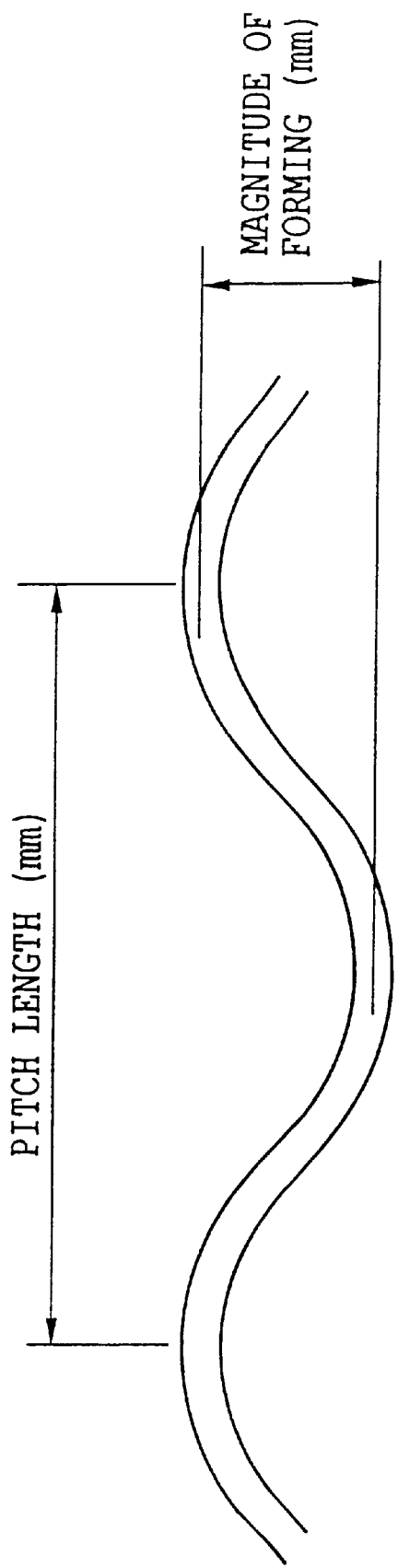
FIG. 4 is a schematic view which explains a pitch length and forming amount of a filament of the steel cord in the first embodiment.

Tables 2 and 3 respectively show the steel cord of the present embodiment and a conventional cord. Further, FIG. 3 shows an S—S curve of each of the cords in Tables 2 and 3, and FIG. 4 shows the results of a compression fatigue resistance of a representative cord.

The cord of No. 1 in Table 3 is a polyester cord which is applied to the ply of a conventional tire for a passenger car. The carcass ply cord thereof is a polyester multi filament cord used for a conventional tire, and uses a polyester multi yarn formed by plying two 1670 dtex multi yarn twined members (that is, 1670 dtex/2 ply) at forty twists per 10 cm length for each of the ply-twisting and cable twisting. After immersing the polyester ply cord into an epoxy liquid, which is a conventional dip liquid for a polyester, the ply was treated in a dry zone at160° C. under1.2 kg/(cord) tension for 60 seconds and in a hot zone at 240° C. under 0.7 kg/(cord) tension for 60 seconds, and was again immersed into a dip liquid comprising a resorcinol-formaldehyde latex (RFL) under a dip tension of 200 g/cord. The ply was again heated again in the dry zone at 240° C. under 1.2 kg/ (cord) tension for 60 seconds and under 0.7 to 0.9 kg/(cord) hot zone tension for 60 seconds, in total for 240 seconds. As a result, the cord to which an adhesive was applied was formed.

In this case, the tension of the final hot zone in the dip treatment process is finely adjusted to between 500 g/cord to 700 g/cord so that an elongation at a specified load under a load of 2.3 g/dtex of the cord becomes 3.7%. A rubber coated sheet of cords (hereinafter referred to as a rubber-coated sheet) is formed so that the cords formed in the aforementioned manner are provided with a count of 50 per 5 cm.

On the other hand, the cords of Nos. 2 and 3 are respectively steel cords having a 1×5 construction and a 1×3 construction and are prepared as examples of the cord used as the belt cord of the conventional radial tire. These cords are generally called "open cords". In the case of open cords, gaps are provided between the filaments so that the inner portion of the cord can be filled with rubber. Due to this rubber filing, water is prevented from entering the inside of the cord and thus corrosion of the cord or the filaments can be effectively prevented. The open cord of this kind has a kind of inflection point since a slight ply tightening is generated at the beginning of the S—S curve. However, since these gaps are provided between the filaments simply for leaving some space for rubber filling at the beginning of the vulcanization, they are hardly sufficient in absorbing the distortion by the curvature of the filament, which is an important feature of the present embodiment. In addition, in order to maintain a high tensile rigidity and a bending rigidity which are an inherent function of the belt, rubber filling has always been attempted with as small space between the filaments as possible. Accordingly, no curvature as great as the filament curvature of the steel cord of this example can be provided.

The steel cords of Nos. 4 and 5 are respectively a ply cord having a 1×5 construction with a filament diameter of 0.15 mm, and a ply cord having a 1×3 construction with a filament diameter of 0.2 mm. These cords have a cord strength of substantially the same as that of the polyester cord of No. 1 generally applied to the ply of the tire for a passenger car. However, since these cords (No. 4 and No. 5) have a normal steel construction, and each of the filaments is brought into contact with each other, the buckling deformation is generated at a time of compression deformation in the same manner as the cords of Nos. 2 and 3. Further, once the buckling is generated in the cord, the buckling is always generated at the same buckling point at a time of a repeated deformation input afterward. As a result, there is a disadvantage that the filament may be cut or even the cord itself may be cut at that point. Accordingly, it is understood that the fatigue resistance against the compression deformation is hardly improved in these cords in spite of the fact that the filament diameter is narrower than the cord used for the belt cord.

Nos. 6, 7, 8, 9 and 10 in Table 4 are steel cords in accordance with the present embodiment. In this case, as shown in Table 4, the cord constructions are 1×3, 1×5 or 1×6, the strength is made substantially near to the strength of the normal polyester ply cord by adjusting the filament diameter. Achieving a cord strength near to that of the normal belt cord by increasing the filament diameter and the filament number could be chosen, however, in order to compare with the polyester cord of No. 1, this kind of cord construction is selected. However, in Nos. 7 and 10, in order to clearly define the effects of each of the materials and cord constructions, the cord strength is slightly changed. As a feature of these cords, the S—S curve of a raw cord, which is a cord before embedded in the matrix rubber composition, is shown in FIG. 3. In a low load area of the S—S curve, a very low initial modulus is indicated, and the modulus is suddenly increased after a certain amount of load is applied. That is, a significant inflection point is recognized in the boundary thereof. More specifically, the filaments are not brought into contact with each other in the low load area, or even if they are brought into contact with each other, the filaments can still freely deform in the low load area. Thereafter, when the filaments can not freely move any more, the curve enters a so-called material deforming area and a high modulus similar to that observed in the normal steel cord is generated. In the present embodiment, a motion of the filament in this low load area is important, and it demonstrates the following two functions after vulcanization. First, since the buckling deformation of the cord or the filament can be restricted and the deformation can be absorbed by the change of the curvature of the filament, the fatigue resistance can be widely improved as shown in FIG. 4. Second, since the rubber is sufficiently impregnated between the filaments, the filaments exist within the rubber in a state where there is almost no contact between the filaments when no stress is applied, and the filaments can deform under the deformation, since the rubber is interposed, without buckling or corrosion being generated. The initial modulus may not be as high as the normal steel cord, however, a modulus higher than the polyester cord can reliably be obtained. In the case of applying a normal steel cord to the tire ply, the riding comfort is reduced due to the high rigidity. However, in the cord of the present embodiment, the riding comfort comparable to polyester can be achieved.

Further, the test results of the compression fatigue resistance of the cords mentioned above is shown in FIG. 4. In the normal cords such as Nos. 2, 3, and 4, the filament is broken by applying approximately 100 to 200 times of distortions at a strain of 3.5%. However, in the case of the cords in accordance with the present embodiment such as Nos. 6, 7, 9 and 10, the filament is not broken up until by the application of between several thousand to as much as fifty thousand times of distortions at a strain of 10.5% which is three times the strain of the conventional cord. Further, it is understood that even when the number of filaments in a cord and the material thereof are changed, the compression fatigue resistance of the cord is not greatly changed.

The results of applying the cord mentioned above to the tire will be specifically described below in detail as examples and comparative examples.

As for the tires used the examples and the comparative examples, the rubber composition of the rubber layer used for the carcass ply is shown in Table 1, and elements contained in the carcass ply cord are shown in Tables 2 and 3. Also, the rubber composition of the coating rubber used for the steel cord reinforced-belt layer (and belt reinforcing layers) is shown in Table 3. Table 1 and Table 2 may also be used or referred to for other embodiments, because the rubber composition of the rubber layer used for the carcass ply may be basically the same in all the embodiments in the present invention and the rubber composition of the coating rubber used for the steel cord reinforced-belt layer (and belt reinforcing layers) may be basically the same in all the embodiments in the present invention.

By using these composition, under vulcanization conditions of 170° C. for 13 minutes, a tire having a tire size 195/65 R14 and a tubeless structure was obtained, and the durability and stick slip resistance of the tire were measured. The results are shown in Table 5. Other than changing the elements of the carcass ply cord, the same tire was used and evaluated in all cases.

Comparative Example 1

This was a conventional tire in which the No. 1 polyester cord formed under the conditions mentioned above was applied to the carcass ply cord. This example was used as a control for estimating the tire durability and the stick slip resistance. Further, the PCI was performed for 26 minutes with the internal pressure at 2.5 kg/cm$^2$.

Comparative Example 2

A tire was formed by using a rubber coated sheet, which was prepared in the same manner as Comparative Example 1 except for using No.3 high strength steel cord as the normal belt cord, in the ply cord. However, since the cord had a high level of strength, a count of 19.3 per 5 cm was set in order to make the ply total strength in the tire the same as the control tire. Further, the PCI was not performed.

Since the filament ductility before breaking was small and the filament diameter was large, the tire durability was also widely reduced in comparison with the control.

Comparative Example 3

A rubber coated sheet using the No. 4 steel cord as the ply cord and having a count of 50 per 5 cm (the cord strength of No. 4 was substantially the same as No. 1 in the comparative example 1) was provided in the tire. The members other than the ply cord were the same as those of comparative example 2. In this case, since the cord had a construction similar to that of a normal steel cord and the ductility before breaking was not enlarged, the tire durability was low and the stick slip phenomenon was observed.

EXAMPLE 1

A rubber coated sheet in which No. 6 steel cord was used as a ply cord and a count of so per 5 cm for ensuring the tire total strength was used as carcass ply, and a tire was formed in the same manner as for comparative example 2. In this case, since pitch length and magnitude of forming of the filament of this cord was increased to a pitch length of 6 mm and a magnitude of forming of approximately 0.58 mm, the distortion could be absorbed by the deformation of the curvature of the filament. As a result, the tire durability was improved, and the stick slip was eliminated. Accordingly, the durability achieved was greater than that of the control tire.

EXAMPLE 2

A tire was produced in the same manner as in example 1 except that No. 8 steel cord was used as the ply cord. In this case, the cord was structured so as to have filaments of 1×5 construction with a filament diameter of 0.15 mm. The pitch length of the filaments was increased to be 7.55 mm and the magnitude of forming was also increased to be about 0.64 mm. As a result, the distortion could now be absorbed by the deformation of the curvature of the filament, the tire durability was improved, and the stick slip was eliminated. Accordingly, the durability achieved was greater than that of the control tire.

EXAMPLE 3

A tire was produced in the same manner as in example 2 except No. 9 steel cord was used as the ply cord. In this case, the cord was structured so as to have filaments of 1×5 construction with a filament diameter of 0.15 mm. The pitch length was increased to 7.6 mm and the magnitude of forming was also increased to about 0.94 mm. As the result, the curvature of the filament was greater than that for No. 8, the tire durability was more improved, the stick slip was eliminated, and the durability achieved was greater than that of example 2.

EXAMPLE 4

No. 10 steel cord was used as the ply cord. The same structure as in example 1 was applied except that the count was 29 per 5 cm. In this case, since the cord used a filament which was made of an ultra high strength steel material, its strength was very much improved in comparison with the normal cord. Note that although the cord material was changed, the tire durability was further improved, and the stick slip was eliminated.

TABLE 1

|  | (PARTS BY WEIGHT) |
| --- | --- |
| NATURAL RUBBER | 100.0 |
| CARBON BLACK (HAF) | 50.0 |
| SPINDLE OIL (SOFTENING AGENT) | 2.0 |
| ZINC OXIDE | 5.0 |
| ANTIOXIDANT[1] | 1.0 |
| VULCANIZATION ACCELERATOR[2] | 0.7 |
| SULFUR | 4.0 |
| ADHESIVE[3] | 0.6 |

[1]NOCRAC 6C (TRADE NAME, MANUFACTURED BY OUCHI SHINKO CHEMICAL INDUSTRIES CO., LTD.)
[2]NOCCELER NS(TRADE NAME, MANUFACTURED BY OUCHI SHINKO CHEMICAL INDUSTRIES CO., LTD.)
[3]MANOBOND C22.5 TRADENAME, MANUFACTURED BY RHONE POULENC)
M50 (TENSILE STRESS AT 50% ELONGATION) = 2.4MPa
M100 (TENSILE STRESS AT 100% ELONGATION) = 4MPa

TABLE 2

|  | (PARTS BY WEIGHT) |
| --- | --- |
| NATURAL RUBBER | 100.0 |
| CARBON BLACK (HAF) | 60.0 |
| SPINDLE OIL (SOFTENING AGENT) | 2.0 |
| ZINC OXIDE | 5.0 |
| ANTIOXIDANT[1] | 1.0 |
| VULCANIZATION ACCELERATOR[2] | 0.8 |
| SULFUR | 0.7 |
| ADHESIVE[3] | 6.0 |

[1]NOCRAC 6C (TRADE NAME, MANUFACTURED BY OUCHI SHINKO CHEMICAL INDUSTRIES CO., LTD.)
[2]NOCCELER NS(TRADE NAME, MANUFACTURED BY OUCHI SHINKO CHEMICAL INDUSTRIES CO., LTD.)
[3]MANOBOND C22.5 TRADENAME, MANUFACTURED BY RHONE POULENC)
M50 (TENSILE STRESS AT 50% ELONGATION) = 2.8MPa
M100 (TENSILE STRESS AT 100% ELONGATION) = 4.7MPa

TABLE 3

| CORD NO. | 1 | 2 | 3 | 4 | 5 |
| --- | --- | --- | --- | --- | --- |
| CORD MATERIAL | POLYESTER | OPEN STEEL | OPEN STEEL | CLOSED STEEL | CLOSED STEEL |
| STRUCTURE[1] | — | 1*5*0.225[3] | 1*3*0.3 | 1*5*0.15 | 1*3*0.20 |
| STRENGTH OF FILAMENT (kg) | — | 13.2 | 23.5 | 5.2 | 8.5 |
| PITCH LENGTH (mm) | — | 9.5 | 16 | 7.7 | 11.4 |
| MAGNITUDE OF FORMING (mm) | — | 0.84 | 0.81 | 0.45 | 1.186 |
| STRENGTH (kg) | 23[4] | 66.2 | 70.2 | 26 | 25.5 |

TABLE 3-continued

| CORD NO. | 1 | 2 | 3 | 4 | 5 |
|---|---|---|---|---|---|
| DUCTILITY BEFORE BREAKING (%) | 13[5] | 2.9 | 2.7 | 2.2 | 2.2 |
| DIAMETER (mm) | 0.66 | 0.8 | 0.83 | 0.44 | 0.31 |
| DIAMETER REDUCTION RATE (%) | — | 28 | 20 | 8 | 6 |
| INFLECTION POINT[2] | NONE | NONE | NONE | NONE | NONE |

[1]STRUCTURE: construction × FILAMENT DIAMETER (mm)
[2]INFLECTION POINT: INFLECTION POINT ON S-S CURVE WITHIN A RANGE OF OVER 1% OF EXTENSION RATE
[3]AN * (ASTERISK) IN TABLE 3 MEANS "MULTI PLIED BY". FOR EXAMPLE, 1*5*0.225 = 1 × 5 × 0.225
[4]MEASURED IN ACCORDANCE WITH JIS L1017-1983
[5]MEASURED IN ACCORDANCE WITH JIS L1017-1983

TABLE 4

| CORD NO. | 6 | 7 | 8 | 9 | 10 |
|---|---|---|---|---|---|
| CORD MATERIAL | STEEL | UHT[4] STEEL | STEEL | STEEL | UHT[4] STEEL |
| STRUCTURE[1] | 1*3*0.2[3] | 1*3*0.2 | 1*5*0.15 | 1*5*0.15 | 1*6*0.15 |
| STRENGTH OF FILAMENT (kg) | 8.4 | 11.5 | 5.2 | 5.2 | 5.2 |
| PITCH LENGTH (mm) | 6 | 6 | 7.55 | 7.6 | 7 |
| MAGNITUDE OF FORMING (mm) | 0.58 | 0.58 | 0.64 | 0.94 | 0.94 |
| STRENGTH (kg) | 25 | 34 | 25.8 | 26.2 | 43 |
| DUCTILITY BEFORE BREAKING (%) | 8 | 8 | 4 | 8.2 | 7.1 |
| DIAMETER (mm) | 0.98 | 0.98 | 0.74 | 1.05 | 0.9 |
| DIAMETER REDUCTION RATE (%) | 60 | 60 | 45 | 65 | 50 |
| INFLECTION POINT[2] | PRESENT | PRESENT | PRESENT | PRESENT | PRESENT |

[1]STRUCTURE: CONSTRUCTION × FILAMENT DIAMETER (MM)
[2]INFLECTION POINT: INFLECTION POINT ON S-S CURVE WITHIN A RANGE OF OVER 1% OF EXTENSION RATE
[3]AN * (ASTERISK) IN TABLE 4 MEANS "MULTIPLIED BY*, FOR EXAMPLE, 1*3*0.2= 1 × 3 × 0.2
[4]UHT: ULTRA HIGH TENSILE

TABLE 5

| | COMPARATIVE EXAMPLE | | | EXAMPLE | | | |
|---|---|---|---|---|---|---|---|
| | 1 | 2 | 3 | 1 | 2 | 3 | 4 |
| CORD NO. | 1 | 3 | 4 | 6 | 8 | 9 | 10 |
| CORD MATERIAL | POLYESTER | STEEL | STEEL | STEEL | STEEL | STEEL | UHT STEEL |
| CORD STRUCTURE | — | 1*3*0.3 | 1*5*0.15 | 1*3*0.2 | 1*5*0.15 | 1*5*0.15 | 1*6*0.15 |
| PERFORMANCE OF TIRE | | | | | | | |
| DRUM DURABILITY (INDEX) | 100 | 29 | 60 | 175 | 142 | 200 | 175 |
| ACTUAL CAR STICK SLIP PERFORMANCE | OBSERVED | OBSERVED | OBSERVED | NONE | NONE | NONE | NONE |

As mentioned above, in the pneumatic tire of the present embodiment, there is obtained an excellent effect in that durability and stick slip resistance are widely improved, by using the carcass ply and/or the belt layer using a specific steel cord. In addition, the PCI is not required and productivity can be improved.

Next, a second embodiment of present invention will be described below.

This embodiment is basically similar to the first embodiment, however, its unique feature exists in that at least one carcass ply of the carcass portion is constituted by a steel cord having a 1×3 structure, and a steel cord having a specific nature is used therefor.

In the normal 1×3 steel cord, the ductility before breaking is about 2% in both the cord and the filament. However, in the present embodiment, the ductility before breaking of the cord is required to be 3.5% or more, and preferably, 4.0% or more. When the ductility before breaking of the cord is less than 3.5%, not only is the slick slip phenomenon generated, but also the fatigue resistance of the cord is significantly deteriorated. Accordingly, it is not preferable.

And as previously mentioned, only a stress which is about 10% of the tensile stress at breaking is considered to be applied to the ply cord in the tire. It is preferable to set the ductility before breaking of the cord to within 15%, preferably to within 10% and more preferably within 8%.

The specific steel cord is prepared in a similar way as in the first embodiment.

Further, the diameter of the filament of the steel cord is 0.125 to 0.275 mm, preferably 0.125 to 0.230 mm. If the diameter is less than 0.125 mm, it is hard to extend the filament in the manufacturing process and the high tensile resistance may be obtained. As a result, the cord strength is lowered, and thus the strength of the case member in the tire is reduced. If the diameter is more than 0.275 mm, the fatigue characteristic is deteriorated and the cord diameter becomes too thick, thus it is not preferable.

The carcass ply used in the present embodiment is a rubber coated sheet constituted by the steel cord and the matrix rubber composition, and can be manufactured by a conventional method.

The structure of the radial tire for the passenger cars of the present embodiment will be described below with reference to the drawings.

A schematic cross sectional view of the radial tire for the passenger cars in accordance with the present embodiment is exemplified in FIGS. 1, 2 and 3.

Both ends of a carcass ply 4 using the steel cord in which carcass ply 4 a cord direction is directed to a radial direction of the tire are bent around a pair of right and left bead wires 6. A height h of a bent portion is 60% of a height H of the carcass ply 4. A height h' of a bead filler rubber 9 is 50% of the height H. Two layers of steel belts 5 are disposed above the carcass ply 4 in the radial direction of the tire in a ring-like shape. Two sheets of belt reinforcing layers 7 and 8 are disposed in the outer periphery thereof and a tread rubber 3 is arranged in a tire road contacting surface portion above the belt reinforcing layers. Further, a side wall portion 2 and a bead portion 1 are arranged on the carcass layer on both sides of the tread rubber 3.

A pneumatic run flat tire 20c in FIG. 3 is structured such that the reinforcing rubber layer 10 having a crescent shaped cross section (for example, rubber having a maximum thickness of 13 mm and a hardness of 80 degrees) for sharing and supporting a load is arranged on an inner peripheral surface of the carcass ply 4 in the side wall portion 2. Members other than this are the same as for FIG. 1. Or this tire may be also have a belt reinforcing layer as shown in FIG. 2.

The various kinds of evaluation methods used for the examples and comparative examples mentioned below are as follows.
(1) Cord tensile test
Performed in the same manner as the aforementioned examples.
(2) Filament tensile test
Performed in the same manner as the aforementioned examples.
(3) Drum durability test
Performed in the same manner as the aforementioned examples.
(4) Stick slip characteristic of actual cars (stick slip resistance) test
Performed in the same manner as the aforementioned examples.

In the tires of the examples and the comparative examples, the composition of the coating rubber (the rubber layer) used for a steel cord reinforced-carcass ply is shown in Table 1 (that is, the composition may be basically the same as in the first embodiment), and elements contained in the carcass ply cord are shown in Tables 6 and 7. Also, the rubber composition of the coating rubber used for the steel cord reinforced-belt layer (and belt reinforcing layers) of the present embodiment is shown in Table 2 (that is, the composition may be basically the same as in the first embodiment).

By using these composition, a tire having a tire size of 195/65 R14 and a tubeless structure was obtained, and the durability and stick slip resistance of the tire were measured. The results are shown in Tables 6 and 7. Except for changing the elements of the carcass ply cord, the same tire was used and evaluated in all cases.

Next, the examples and the comparative examples of the present embodiment will be described in detail.

Comparative Example 21

This is a tire using a polyester carcass which is generally sold in the market. This tire was used as a control. The tire was manufactured in the same manner as other steel ply tires to be evaluated except that a rubber coated cloth for the carcass ply was prepared as below.

The carcass ply cord thereof was a polyester multi filament used for the conventional tire, which included a polyester multi yarn of 1670 dtex/2 ply which was prepared in the same manner as in the first embodiment.

A rubber coated sheet was prepared so that the cords formed in the aforementioned way were provided with a count of 50 per 5 cm.

The tire was manufactured under vulcanization conditions, which was 170° C.×13 minutes, PCI internal pressure 2.5 kg/cm² and time duration 26 minutes.

This tire substantially equal to the conventional one was set as a control tire, and the tire durability and the stick slip resistance were estimated.

Comparative Example 22

The high tension steel cord having a filament diameter 0.3 mm and a 1×3 construction and used as the conventional belt cord in the ply material was used. A rubber coated sheet was prepared in the same manner as in the comparative example 21 except that the high tension steel cord having a filament diameter 0.3 mm and a 1×3 construction and used as the conventional belt cord in the ply material was employed. This rubber coated sheet was used for the carcass ply. Since this cord had a high cord strength, the rubber coated sheet was structured such that the count was 19.3 per 5 cm and the ply total strength in the tire became the same level as that of the control tire. Further, the PCI was not performed.

Since the filament ductility before breaking was small and the filament diameter was large, the tire durability was widely reduced in comparison with the control.

Comparative Example 23

The steel cord made of a normal strength steel material and having a filament diameter of 0.3 mm and a 1×3 construction was used as the ply material. Experimental conditions were the same as those in comparative example 22 except that a count of 21 per 5 cm was set for securing the tire total strength. Since the filament of this cord was structured such that the ductility before breaking was large by setting the pitch at 8 mm and the magnitude of 1 formation at approximately 0.68 mm, the cord diameter was approximately 1.05 mm.

The tire durability was improved in comparison with comparative example 2, but still poorer than the control.

Comparative Example 4

The steel cord made of a normal strength steel material and having a filament diameter of 0.25 mm and a 1×3 construction was used as the ply material. Experimental conditions were the same as those in comparative example 2 except that a count of 29 per 5 cm was set. Since this cord was structured such that its construction was the same as the conventional steel cord and the ductility before breaking was not made large, the tire durability was low and the stick slip phenomenon was observed.

EXAMPLE 1

The steel cord made of a normal strength steel material and having a filament diameter of 0.25 mm and a 1×3 construction was used as the ply material. Experimental conditions were the same as those in comparative Example 4 except that the count was set at 29 per 5 cm. Since the filament of this cord was structured such that its ductility before breaking was made large by setting the pitch at 8 mm and the magnitude of formation about 0.6 mm, the tire durability was improved, and the slick slip was not observed. As a result, better durability than in the control tire could be secured.

Comparative Example 5

The steel cord made of a normal strength steel material and having a filament diameter of 0.20 mm and a 1×3 construction was used as the ply material. The count was set at 50 per 5 cm because the cord had substantially the same cord strength as the control tire. The pitch length of the filament was about 11 mm, the magnitude of the formation rate was 0.4 mm and the cord S—S curve did not have an inflection point as in the normal steel cord. As a result, the tire durability was poor and the stick slip was observed.

EXAMPLES 2 to 4

The steel cord made of a normal strength steel material and having a filament diameter of 0.20 mm and a 1×3 construction was used as the ply material. The count was set at 50 per 5 cm because the cord had substantially the same cord strength as the control tire. The pitch lengths of the filaments of the examples 2, 3, and 4 were respectively set at about 10 mm, about 10 mm and about 11.5 mm. The magnitude of formation rates were respectively 0.75 mm, 0.88 mm, and 1.1 mm. The cord S—S curve had an inflection point different from the conventional steel cord and the ductility before breaking increased. As a result, the tire durability was improved and the stick slip was not observed.

Comparative Example 6 and Example 5

The steel cord made of a normal strength steel material and having a filament diameter of 0.15 mm and a 1×construction was used as the ply material. Since the cord strength was small, in this case, the count was set at 80 per 5 cm. Further, since the ductility before breaking of comparative example 6 and example 5 were respectively adjusted and set at 2.2% and 5.6%, a great difference was made in the tire durability and such a difference was recognized in the stick slip as well.

Figure 7:
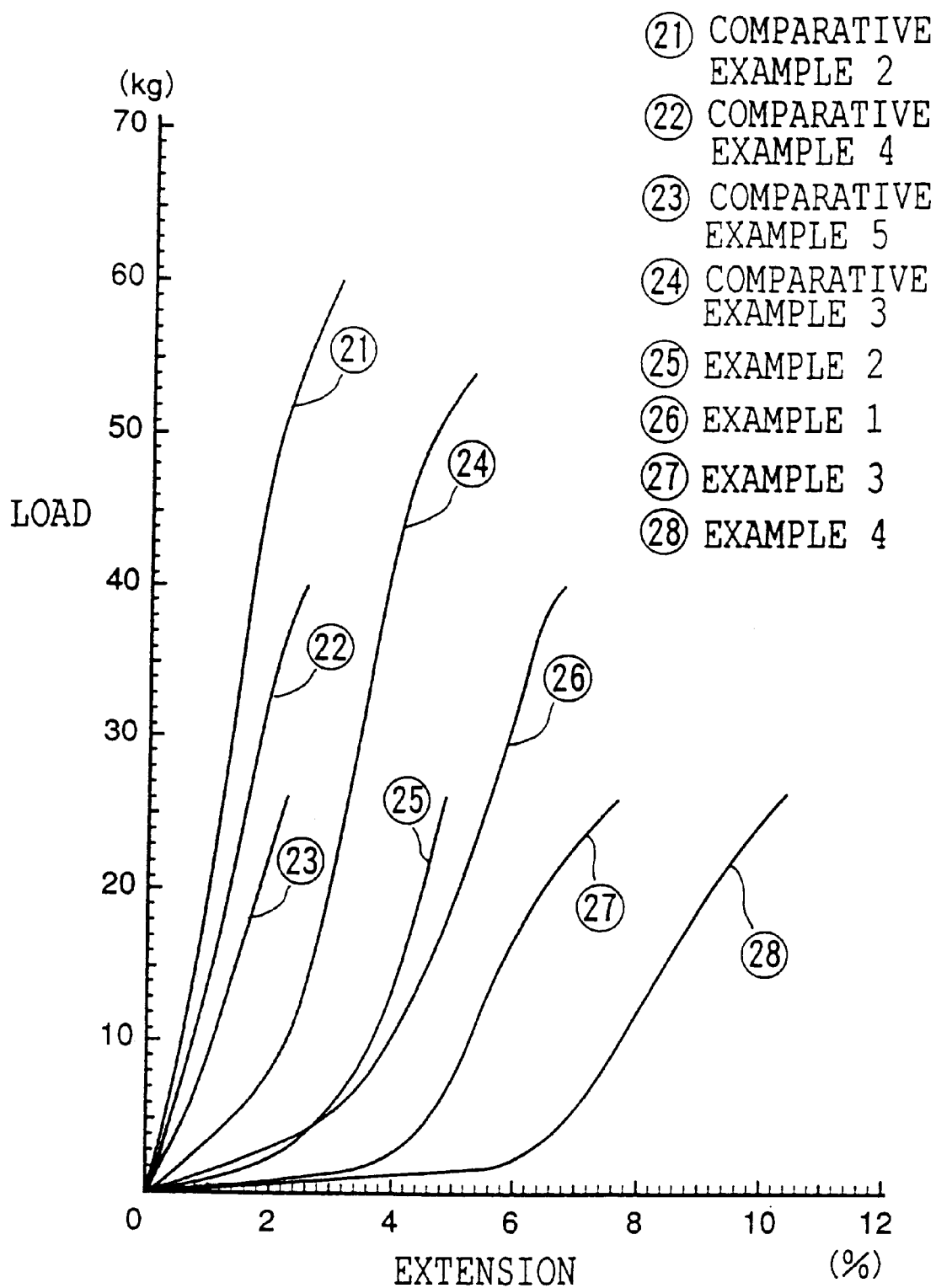
FIG. 7 is a graph which shows an S—S curve of a steel cord in an example of the second embodiment and corresponding comparative examples.

The S—S curve of the steel cord used in each of the examples and the comparative examples mentioned above will be shown in FIG. 7.

TABLE 6

|  | COMPARATIVE EXAMPLE 21 | COMPARATIVE EXAMPLE 22 | COMPARATIVE EXAMPLE 23 | COMPARATIVE EXAMPLE 24 | EXAMPLE 21 | COMPARATIVE EXAMPLE 25 |
|---|---|---|---|---|---|---|
| CARCASS PLY CORD |  |  |  |  |  |  |
| MATERIAL | POLYESTER | STEEL | STEEL | STEEL | STEEL | STEEL |
| STRUCTURE | — | 1 × 3 × 0.3 | 1 × 3 × 0.3 | 1 × 3 × 0.25 | 1 × 3 × 0.25 | 1 × 3 × 0.2 |
| DIAMETER (mm) | — | 0.61 | 0.66 | 0.53 | 0.9 | 0.76 |
| STRENGTH (kg) | 23 | 60 | 105 | 40 | 40 | 26 |
| DUCTILITY BEFORE BREAKING (%) | 13 | 3 | 5.2 | 2.5 | 6.7 | 2.2 |
| DIAMETER OF FILAMENT (mm) |  | 0.3 | 0.3 | 0.25 | 0.25 | 0.2 |
| STRENGTH OF FILAMENT (mm) | — | 20 | 17.5 | 13.9 | 13.6 | 9.2 |
| DUCTILITY BEFORE BREAKING OF FILAMENT (%) | — | 3.2 | 8 | 3 | — | 2.9 |
| PITCH OF FILAMENT (mm) | — | — | 8 | — | 8 | 11.4 |
| PERFORMANCE OF TIRE |  |  |  |  |  |  |
| DRUM DURABILITY (km) | 12000 | 3500 | 4800 | 3900 | 14000 | 7800 |
| DRUM DURABILITY (INDEX) | 100 | 29 | 40 | 33 | 117 | 65 |
| ACTUAL CAR STICK SLIP PERFORMANCE | NONE | PRESENT | PRESENT | PRESENT | NONE | PRESENT |

TABLE 7

|  | EXAMPLE 22 | EXAMPLE 23 | EXAMPLE 24 | COMPARATIVE EXAMPLE 26 | EXAMPLE 25 |
|---|---|---|---|---|---|
| CARCASS PLY CORD |  |  |  |  |  |
| MATERIAL | STEEL | STEEL | STEEL | STEEL | STEEL |
| STRUCTURE | 1 × 3 × 0.2 | 1 × 3 × 0.2 | 1 × 3 × 0.2 | 1 × 3 × 0.15 | 1 × 3 × 0.15 |
| DIAMETER (mm) | 0.98 | 1.13 | 1.28 | — | — |
| STRENGTH (kg) | 26 | 25.8 | 26.2 | 14.6 | 14.5 |
| DUCTILITY BEFORE BREAKING (%) | 4.8 | 7.6 | 10.4 | 2.2 | 5.6 |
| DIAMETER OF FILAMENT (mm) | 0.2 | 0.2 | 0.2 | 0.15 | 0.15 |
| STRENGTH OF FILAMENT (mm) | 8.9 | 8.9 | 8.7 | — | — |

TABLE 7-continued

|  | EXAMPLE 22 | EXAMPLE 23 | EXAMPLE 24 | COMPARATIVE EXAMPLE 26 | EXAMPLE 25 |
|---|---|---|---|---|---|
| DUCTILITY BEFORE BREAKING OF FILAMENT (%) | 5.4 | 6.5 | 6.3 | — | — |
| PITCH OF FILAMENT (mm) | 9.8 | 9.9 | 11.4 | — | — |
| PERFORMANCE OF TIRE |  |  |  |  |  |
| DRUM DURABILITY (km) | 19000 | 21000 | 36000 | 7500 | 22000 |
| DRUM DURABILITY (INDEX) | 158 | 175 | 300 | 63 | 183 |
| ACTUAL CAR STICK SLIP PERFORMANCE | NONE | NONE | NONE | PRESENT | NONE |

As mentioned above, in accordance with the pneumatic tire for a passenger car in the present embodiment, there is obtained the advantage that durability and stick slip resistance are greatly improved by using the carcass ply using a specific steel cord. In addition, as the PCI is not required, productivity can also be improved.

Next, second aspect, according to the present invention will be described below as the third embodiment.

The present embodiment is characterized in that riding comfort and stick slip resistance of a pneumatic tire having a carcass ply reinforced by a steel cord can be improved by using an organic fiber cord or a specific steel cord for at least one layer of the belt portion so as to reduce the rigidity of the belt portion.

In the pneumatic tire for a passenger car of the present embodiment, at least one layer of the belt portion comprising at least two layers is constituted by an organic fiber cord or a specific steel cord in accordance with the present embodiment. Accordingly, for example, in the case in which the belt portion comprise two layers, the belt layers are constituted by a combination of an organic fiber cord layer and conventional steel cord layer, or a combination of the specific steel cord layer in accordance with the present embodiment and the conventional steel cord layer, or a combination of two organic fiber cord layers, or a combination of two specific steel cord layers in accordance with the present embodiment or a combination of the organic fiber cord layer and the specific steel cord layer in accordance with the present embodiment.

The type of organic fiber cord is not particularly limited, and includes generally used organic fibers, such as a polyester cord such as a polyethylene terephthalate, a polyethylene naphthalate and the like, an aromatic polyamide (aramid) cord, an aliphatic polyamide cord such as nylon and the like, a polybenzoxazole (PBO) cord, a polyvinyl alcohol (PVA) cord, a polyolefine ketone (POK) cord, a rayon cord and the like. Further, these cords may be used in combination. Among these cords, a polyester cord and an aramid cord are preferable in view of the effect.

An example of the rubber composition of the coating rubber for the organic cord reinforced-belt layer and belt reinforcing layer is shown in Table 8.

TABLE 8

|  | (PARTS BY WEIGHT) |
|---|---|
| NATURAL RUBBER | 80.0 |
| Styrene-Butadiene Rubber[1] | 20.0 |
| CARBON BLACK (HAF) | 60.0 |
| SPINDLE OIL (SOFTENING AGENT) | 2.0 |
| ZINC OXIDE | 3.0 |
| ANTIOXIDANT[1] | 1.0 |

TABLE 8-continued

|  | (PARTS BY WEIGHT) |
|---|---|
| VULCANIZATION ACCELERATOR[5] | 0.8 |
| Stearic Acid | 1.0 |
| sulfer | 2.5 |

[1] #1500 (TRADE MARK, MANUFACTURED BY JSR CO., LTD.)
[2] NOCRAC 6C (TRADE NAME, MANUFACTURED BY OUCHI SHINKO CHEMICAL INDUSTRIES CO., LTD.)
[3] NOCCELER NS(TRADE NAME, MANUFACTURED BY OUCHI SHINKO CHEMICAL INDUSTRIES CO., LTD.)
M50 TENSILE STRESS AT 50% ELONGATION) = 2.8MPa
M100 (TENSILE STRESS AT 100% ELONGATION) = 4.7MPa

It should be noted that, in the tires of the following examples and the comparative examples of the present embodiment, the composition of the coating rubber (the rubber layer) used for a steel cord reinforced-carcass ply may be that shown in Table 1 (that is, the composition may be basically the same as in the first embodiment). Similarly, the rubber composition of the coating rubber used for the steel cord reinforced-belt layer (and belt reinforcing layers) of the present embodiment may be that shown in Table 2 (that is, the composition may be basically the same as in the first embodiment).

In accordance with this embodiment, as mentioned above, the feature of the specific steel cord used in at least one layer of the belt layers is summarized in that "the distortion input applied to the cord is absorbed by the deformation of the curvature of the filament". Accordingly, as long as the cord is made of a proper cord material, the constructions are not particularly limited and any kinds described before can be used this feature.

When this specified steel cord is applied for at least one layer of the belt cord, the reduction rate of the diameter of the cord is 35% or more, and preferably 45% or more for sufficiently ensuring the fatigue characteristic of the cord.

Further, as mentioned in the first embodiment, the organic ply cord in the tire is considered to receive about 10% of the cut strength, and the steel cord of the present embodiment is easily extended under a low stress in particular, has a initial extension modulus equal to that of a nylon or a polyester, and a riding comfort of the tire can be improved.

Further, the diameter of the filament of the specific steel cord is 0.125 to 0.275 mm, and preferably 0.125 to 0.230 mm. When the diameter is less than 0.125 mm, since it is hard to extend the wire and thus difficult to output a sufficient tensile strength at a time of manufacture, the cord strength is lowered. When the diameter is over 0.275 mm, the fatigue characteristic is deteriorated and the cord diameter becomes too thick, Which is not preferable, either.

Conventionally, as the reinforcing material for the belt layer of a radial tire, the steel cord has been used in many cases. However, there is a disadvantage in such an application that cord bending is generated when the cord count is reduced so as to reduce the weight of the steel cord. This has been an obstacle in the way of lightening the tire.

A so-called open cord in which the matrix rubber composition is impregnated inside the cord for the purpose of improving corrosion fatigue resistance is commonly used as a belt cord. However, in the case of the filament of the steel cord used for the present embodiment, it can deform to an extent that its diameter is reduced by 35% or more under a load stress which is one third of the cut strength, significantly improving the fatigue resistance of the cord as mentioned above. Further, in the cord of the present embodiment, the cord bending as seen in the conventional steel cord is not generated even when the count number of the belt cord is widely reduced. The steel cord of the present embodiment is formed by plying a plurality of filaments having a strand diameter of 0.125 to 0.275 mm. The steel cord has an inflection point on the S—S curve thereof within a range of over 1% of extension rate and has a reduction rate of the diameter of the cord being equal to or more than 20% and, preferably, equal to or more than 35%. Accordingly, there is an advantage that the cord bending as seen in the conventional steel cord is not generated even when the cord count of the belt cord is significantly reduced.

In the present embodiment, this steel cord can be used for at least one layer of the belt portion.

Further, the pneumatic tire for a passenger car of the present embodiment may have at least one belt reinforcing layer. This belt reinforcing layer may be provided in a whole (as a "cap") and/or at both end portions (as a "layer") of the belt layer.

The belt layer used in this embodiment comprises the reinforcing cord and the matrix rubber composition, and can be manufactured by a conventional method.

A structure of the pneumatic tire in accordance with the present embodiment will be described below with reference to the drawings.

A schematic cross sectional view of the pneumatic tire of the present embodiment is shown in each of FIGS. 1, 2 and 3.

A pneumatic tire 20a in FIG. 1 is structured such that both ends of a carcass ply 4 using the steel cord in which the cords are arranged in the radial direction of the tire are bent around a pair of right and left bead wires 6. A height h of a bent portion is 60% of a height H of the carcass ply 4, and a height h' of a bead filler rubber 9 is 50% of the H. Two layers of steel belts 5 are disposed above the carcass ply 4 in the radial direction of the tire in a ring shape, and at least one layer of the belts is an organic fiber or steel cord in accordance with the present embodiment. Further, tread rubber 3 is arranged in a tire road contacting surface portion above the belts 5. Further, a side wall portion 2 and a bead portion are disposed on the carcass layer on both sides of the tread rubber 3.

The pneumatic tire 20b in FIG. 2 is structured such that two sheets of belt reinforcing layers 7 (cap) and 8 (layer) are disposed in an outer periphery side of the two layers of steel belt 5 provided in the same manner as FIG. 1. members other than this are the same as in FIG. 1.

A pneumatic run flat tire 20C in FIG. 3 is structured such that the reinforcing rubber layer 10 having a crescent shaped cross section (for example, rubber having a maximum thickness of 13 mm and a hardness of 80 degrees) for sharing and supporting a load is arranged on an inner peripheral surface of the carcass ply 4 in the side wall portion 2. Members other than this are the same as for FIG. 1.

Explanation of the Cord

Table 9 describes the details of the belt cord according to the present embodiment and a conventional belt cord. Further, FIG. 12 shows an S—S curve of each of the cords in Table The cord of No. 1 is a steel cord having a 1×3×0.3 open structure which is an example of the cord used as the belt cord of a conventional radial tire. The cord indicates the S—S curve as shown by (31) in FIG. 8.

The cord of No. 2 is made of an aramid multi yarn of 1670 dtex/2 structure using kevlar(trade mark, manufactured by E.I. Du Pont de Nemours). The twist numbers of both ply twist and cable twist were 32 turn/10 cm. The cord to which an adhesive has been applied was formed by dip treating the aramid ply cord in epoxy type adhesive and a resorcinol-formaldehyde-latex type adhesive in accordance with a known method. The obtained cord indicates the S—S curve as shown by (32) in FIG. 12.

The cord of No. 3 is a mono filament of a polyester 3340 dtex, which has been treated by a dip solution in the same manner as in the case of the aramid fiber of No. 2. The cord indicates the S—S curve as shown by (33) in FIG. 12.

The cord of No. 4 is a steel cord of 1×3×0.3, having a pitch length of 8 mm and a filament magnitude of forming of 1.1 mm, so as to be able to absorb a distortion by the filament deformation. The S—S curve shown by (34) in FIG. 12 is obtained.

The cord of No. 5 is a steel cord of 1×5×0.15, having a pitch length of 7.55 mm and a filament magnitude of forming of 0.64 mm, so as to be able to absorb a distortion by the filament deformation. The S—S curve shown by (35) in FIG. 12 is obtained. The cords of No. 4 and No. 5 are those in accordance with the present invention, which clearly show an inflection point in their S—S curves.

The cord of No. 6 is a steel cord of 1×5×0.225 as an example of the cord used as the belt cord for a conventional radial tire. This cord indicates the similar motion as that of the cord No. 1, and the S—S curve shown by (36) in FIG. 12 is obtained.

The results in a case in which a organic fiber cord or a steel cord mentioned above is applied to the belt layer of the tire will be described below in detail as examples and comparative examples.

Normal tires are exemplified in a comparative example 1 and examples 1 to 5.

The tire to be examined has the structure shown in FIG. 1 and a tubeless structure having a size 195/65 R14, and uses a rubber-coated sheet as a carcass ply in which the conventional steel cord of 1×5×0.225 are provided at a count number of 36 per 5 cm. The belt comprises two layers. In the tire used in the comparative example 1 and the examples 1 to 4, one layer comprises a layer reinforced by the conventional steel cord and another layer comprises a layer reinforced by the cord shown in table 9. In the tire used in the example 5, both two layers are reinforced by the cord of the present embodiment. The cord used for each of the tires and a material and a structure thereof are shown in Tables 9 and 10. The belt cord is arranged with an angle of 20 degrees with respect to the tire peripheral direction. The composition of a rubber composite used for each of the rubber coated sheet( the steel cord reinforced-carcass ply) mentioned above may be that shown in Table 1( the same as in the first embodiment), as previously mentioned. The tire was formed under these conditions, and the riding comfort and the stick slip performance of the tire were measured. The results are shown in Table 10. Except that the elements of the belt cord were changed, all the tires used for the estimation had the same feature.

Comparative Example 1

The tire was formed such that both two belt layers used the rubber-coated sheet prepared by providing the steel cord of 1×3×0.30 (the cord No. 1) as the reinforcing material at the count number of 33 per 5 cm.

The cord had a construction which was the same as that of the normal belt cord. Accordingly, the ductility at breaking was small, the riding comfort was not sufficient and the stick slip phenomenon was observed. By setting the tire of the comparative example 1 as the control tire, the tire performance of each of the examples was estimated.

EXAMPLE 31

Among two sheets of the belt layers, the aramid cord of 1670 dtex/2 and twist number of 32×32 (twist number of ply twist×twist number of cable twist) /10 cm was used as the belt cord of one sheet. In this case, the strike number was set to be 33 per 5 cm in the same manner as the comparative example 1. Since the ductility at breaking of the cord was increased, the riding comfort of the tire was improved, and the stick slip was eliminated.

EXAMPLE 32

For one of the two sheets of the belt layers, a rubber-coated sheet in which a polyester (PET: polyethylene terephthalate) mono filament (cord No. 3) of 3340 dtex were provided at the count number of 52 per 5 cm was used as the belt cord. Since the PET was used, the ductility before breaking of the cord was significantly increased, the riding comfort of the tire was improved, and the stick slip was eliminated.

EXAMPLE 33

For one of the two sheets of the belt layers, a rubber-coated sheet prepared in the same manner as the comparative example 1 except for using the steel cord of No. 4 as the belt cord was used. The steel cord of No. 4 had 1×3×0.30 construction, the pitch length of 8 mm and the magnitude of forming of 1.1 mm and was capable of absorbing the distortion by the deformation of the filament. Since the distortion could be absorbed by the deformation of the curvature of the filament, the riding comfort and the stick slip resistance were both improved.

EXAMPLE 34

For one sheet of the two sheets of the belt layers, a rubber-coated sheet, which was prepared in the same manner as comparative example 1 except that the steel cord No. 5 was used as the belt cord was used. And the strike(count) number was set to be 45 per 5 cm in order to overcome the low strength. The steel cord of No. 5 had a 1×5×0.15 construction, a pitch length of 7.55 mm and the magnitude of forming of 0.64 mm and was capable of absorbing the distortion by the deformation of the filament. Both of the riding comfort and the stick slip resistance were greatly improved in the same manner as the example 3.

EXAMPLE 35

Both of two sheets of the belt layers used the rubber-coated sheet prepared in the example 3, and a tire was produced. The riding comfortability was further improved in comparison with the example 3, and the stick slip was eliminated.

Next, run flat tires are exemplified in an comparative example 32 and an example 36.

The tire to be examined has a structure shown in FIG. 3. The belt comprises two layers, one layer uses a rubber coated sheet prepared by providing steel cords of 1×5×0.225 at the strike (count) number 36 per 5 cm, and another layer uses a rubber coated sheet prepared as shown in Table 11. Further, a reinforcing rubber layer having a compound recipe shown in Table 1, a hardness 80° after vulcanization, and a maximum thickness 13 mm, is arranged inside the carcass main body. Except this, the same structures as the normal tire were employed. The riding comfort and the stick slip resistance of the obtained run flat tire were measured. The results are shown in Table 11.

Comparative Example 32

The tire was formed such that both two belt layers used a rubber coated sheet prepared by providing the steel cord of 1×5×0.225 (the cord No. 6) at the strike number 36 per 5 cm. The performance of the control tire, when the internal pressure was sufficiently charged, shows that the riding comfort and the stick slip resistance were not good since the disconnection extension degree of the cord was small. The tire of the example 6 was estimated by setting this tire of the comparative example 2 as the control.

EXAMPLE 36

One of the two sheets of the belt layers used a rubber coated sheet formed in the same manner as the comparative example 32, and for another sheet, the rubber coated sheet used in the example 4 in which the steel cords of No. 5 were provided as the belt cord, at the strike number 46 per 5 cm, was used.

Since the distortion could be absorbed by the deformation of the curvature of the filament, the riding comfort of the tire was improved, the stick slip was eliminated, and particularly the riding comfort better than the control tire was achieved. Further, the durability in the run flat state in which the internal pressure of the tire became low was excellent in comparison with the tire of the comparative example 32.

TABLE 9

| CORD NO. | 31 | 32 | 33 | 34 | 35 | 36 |
|---|---|---|---|---|---|---|
| BELT CORD MATERIAL | STEEL | ARAMID[4] | POLYESTER[5] | STEEL | STEEL | STEEL |
| STRUCTURE[1] | OPEN 1*3*0.3[3] | — | — | 1*3*0.3 | 1*5*0.15 | 1*5*0.225 |
| STRENGTH OF FILAMENT (kg) | 23.5 | — | — | 17.5 | 5.2 | 13.2 |
| PITCH LENGTH (mm) | 16 | — | — | 8 | 7.55 | 9.5 |

TABLE 9-continued

| CORD NO. | 31 | 32 | 33 | 34 | 35 | 36 |
|---|---|---|---|---|---|---|
| MAGNITUDE OF FORMING (mm) | 0.81 | — | — | 1.1 | 0.64 | 0.84 |
| STRENGTH (kg) | 70.2 | 56.3[6] | 23[6] | 50.5 | 25.8 | 66 |
| DUCTILITY BEFORRE BREAKING (%) | 2.4 | 5.3[6] | 13[6] | 7.7 | 4 | 2.9 |
| DIAMETER (mm) | 0.61 | 0.63 | 0.66 | 0.72 | 0.74 | 0.57 |
| DIAMETER REDUCTION RATE (%) | 20 | — | — | 57 | 65 | 28 |
| INFLECTION POINT[2] | NONE | NONE | NONE | PRESENT | PRESENT | NONE |

[1]STRUCTURE: CONSTRUCTION × FILAMENT DIAMETER (MM)
[2]INFLECTION POINT: INFLECTION POINT ON S-S CURVE WITHIN A RANGE OF OVER 1% OF THE EXTENSION RATE DEFORMATION
[3]AN* (ASTERISK) IN TABLE 9 MEANS "MULTIPLIED BY". FOR EXAMPLE, 1*3*0.3 = 1 × 3 × 0.3
[4]ARAMID: KEVLAR (TRADE NAME, PRODUCED BY TORAY-DUPONT CO., LTD.)
[5]POLYESTER: POLYETHYLENE TEREPHTHALATE (PET) MONO FILAMENT
[6]MEASURED IN ACCORDANCE WITH JIS L1017-1883

TABLE 10

| | COMPARATIVE EXAMPLE | EXAMPLE | | | | | |
|---|---|---|---|---|---|---|---|
| | 31 | 31 | 32 | 33 | 34 | 35 | 36 |
| TYPE OF TIRE | NORMAL TIRE | NORMAL TIRE | NORMAL TIRE | NORMAL TIRE | NORMAL TIRE | NORMAL TIRE | NORMAL TIRE |
| PLY CORD | | | | | | | |
| MATERIAL | STEEL | STEEL | STEEL | STEEL | STEEL | STEEL | 34 |
| STRUCTURE[1] | 1*5*0.225 | 1*5*0.225 | 1*5*0.225 | 1*5*0.225 | 1*5*0.225 | 1*5*0.225 | 1*3*0.3 |
| BELT CORD | | | | | | | |
| FIRST LAYER | | | | | | | |
| CORD NO. | 31 | 32 | 33 | 34 | 35 | 34 | 34 |
| MATERIAL | STEEL | ARAMID | POLYESTER | STEEL | STEEL | STEEL | STEEL |
| STRUCTURE[1] | 1*3*0.3 | — | — | 1*3*.0.3 | 1*5*0.15 | 1*3*0.3 | 1*3*0.3 |
| COUNT[2] | 33 | 33 | 52 | 33 | 45 | 33 | 33 |
| SECOND LAYER | | | | | | | |
| CORD NO. | 31 | 31 | 31 | 31 | 31 | 34 | 31 |
| MATERIAL | STEEL | STEEL | STEEL | STEEL | STEEL | STEEL | STEEL |
| STRUCTURE[1] | 1*3*0.3 | 1*3*0.3 | 1*3*0.3 | 1*3*0.3 | 1*3*0.3 | 1*3*0.3 | 1*3*0.3 |
| COUNT[2] | 33 | 33 | 33 | 33 | 33 | 33 | 33 |
| PERFORMANCE OF TIRE | | | | | | | |
| RIDING COMFORT | CONTROL | +2 | +4 | +3 | +4 | +4 | +5 |
| ACTUAL CAR STICK SLIP PERFORMANCE | PRESENT | NONE | NONE | NONE | NONE | NONE | NONE |

[1]STRUCTURE: CONSTRUCTION × DIAMETER OF FILAMENT (mm)
[2]COUNT: NUMBER CORDS PER 5 cm

TABLE 11

| | COMPARATIVE EXAMPLE 32 | EXAMPLE 36 |
|---|---|---|
| TYPE OF TIRE | RUN FLAT TIRE | RUN FLAT TIRE |
| PLY CORD | | |
| MATERIAL | STEEL | STEEL |
| STRUCTURE[1)] | 1*5*0.225 | 1*5*0.225 |
| BELT CORD | | |
| FIRST LAYER | | |
| CORD NO. | 36 | 35 |
| MATERIAL | STEEL | STEEL |
| STRUCTURE[1)] | 1*5*0.225 | 1*5*0.15 |
| COUNT[2)] | 36 | 46 |
| SECOND LAYER | | |
| CORD NO. | 36 | 36 |
| MATERIAL | STEEL | STEEL |
| STRUCTURE[1)] | 1*5*0.225 | 1*5*0.225 |
| CCOUNT[2)] | 36 | 36 |
| PERFORMANCE OF TIRE | | |
| RIDING COMFORT | CONTROL | +3 |
| ACTUAL CAR STICK SLIP PERFORMANCE | PRESENT | NONE |

[1)]STRUCTURE: CDNSTRUCTION × DIAMETER OF FILAMENT (mm)
[2)]COUNT: NUMBER OF CORDS PER 5 cm

Various estimating methods employed in the tests are as follows.

(1) Steel Cord Tensile Test

Performed in the same manner as the aforementioned examples.

The total extension at a time of cutting was calculated by the following formula.

Total extension at disconnection (%)=(E/L)×100 wherein E: extension at disconnection (mm), L: grip interval Further, the S—S curve was drawn by a load-extension automatic recording apparatus.

(2) Steel Filament Tensile Test

Performed in the same manner as the aforementioned examples.

(3) Pitch Length and Magnitude of Forming

Performed in the same manner as the aforementioned examples.

(4) Riding Comfort

An actual running test was performed on a dry asphalt road in a test course by using an FF 4 door sedan. Comprehensive estimation was done based on the impression of a test driver.

The estimation result is shown by a numerous value with + or − which indicate a difference between the examined tire and the control. The greater a positive value, the more excellent the performance. ±0 means that the test driver could not detect a difference of the performance between them. +1 means that the performance of the examined tire was excellent to an extent that the test driver was able to detect the difference between them when he/she carefully observed it. +2 means that the performance of the supplied tire was excellent to an extent that the test driver was able to detect a significant difference of the performance between them. +3 means that the performance of the examined tire was excellent to an extent that the test driver was able to detect a very significant difference of the performance between them. +4 means that the performance of the examined tire was excellent to an extent that an ordinary driver (that is, not a professional test driver) could have detected a difference of the performance between them. Finally, +5 means that the performance of the examined tire was very excellent such that an ordinary driver could have easily detected a difference of the performance between them.

(5) Stick Slip Characteristic of Actual Cars (Stick Slip Resistance)

Performed in the same manner as the aforementioned examples.

(6) Reduction Rate of Cord Diameter

Performed in the same manner as the aforementioned examples.

As mentioned above, in the pneumatic tire according to the present embodiment, there is obtained an advantage that a riding comfort and a stick slip resistance are greatly improved by using the organic fiber cords or the specific steel cords for at least one sheet of the belt layer.

Next, a fourth embodiment according to the present invention will be described below.

In this embodiment, run flat tires having a specific feature is used as the reinforcing cord of at least one of the reinforcing layers.

As previously mentioned, the steel cord used for the present embodiment can have a low modulus and a high ductility before breaking by making the magnitude of forming relatively larger than that of the filament pitch length of the cord. Accordingly, the compression fatigue resistance is widely improved in comparison with the conventional steel cord, so that the compression input can be absorbed by the deformation of the steel cord itself.

In the present embodiment, the disadvantage of the conventional steel cord can be overcome by the aforementioned significant improvement of the compression fatigue resistance. In addition, the known advantageous feature of the steel cord such as a high flexural rigidity and the like remains effective as it is. That is, in the case of comparing the PET cord with the steel cord, the magnitude of deflection of the steel cord at the internal pressure (of the tire) 0 kg/cm$^2$ is reduced since the steel cord has a high flexural rigidity. As a result, the heat generated by the tire decreases as well. Accordingly, in the present embodiment, the pneumatic safe tire which is excellent in the run flat durability can be provided.

The steel cord used in the present embodiment has 1×n construction, in which n is a natural number equal to or less than 7, preferably equal to or less than 6. When n is more than 7, an arrangement of the filament is easily disturbed. This is not preferable because the impregnating performance of the matrix rubber into the steel cord is lowered, the alignment of the cord is disturbed, and the high disconnection extension degree can hardly obtained. Further, the diameter of the filament of the steel cord is 0.125 to 0.275, preferably 0.125 to 0.230. In a case in which the diameter is less than 0.125, it is hard to extend the wire and thus difficult to obtain a sufficiently large tensile strength in manufacturing. As a result, the cord strength is lowered and the strength of the case member of the tire is also lowered. In a case in which the diameter is more than 0.275, it is not preferable, either, since the fatigue resistance is deteriorated. Further, the ductility before breaking of the steel cord taken out from the tire is equal to or more than 3.5%, preferably equal to or more than 4.0%. When the extension degree is less than 3.5%, it is not preferable in view of the fatigue resistance of the steel cord itself.

The carcass ply used in the present embodiment is constituted by the specific steel cord and a matrix rubber composition, and can be manufactured by the conventional method.

In the present embodiment, the run flat durability is further improved by providing a rubber reinforcing layer having a crescent cross section on an inner surface and/or an outer surface of the carcass layer using the steel cord. Providing the rubber reinforcing layer on the inner surface is particularly preferable.

In the pneumatic safe tire in the present embodiment, at least one sheet of the down carcass layers may be arranged between the side wall portion and the outer surface of the carcass layer comprising the steel cord.

A structure of the pneumatic safe tire in accordance with the present embodiment will be described below with reference to the drawings.

An example of a schematic cross sectional view of the pneumatic safe tire of the present embodiment is shown in FIG. 9.

Both ends of a turned up carcass ply 4a using a layer of steel cord in which a cord direction is directed to a radial direction of the tire 20e are turned around a pair of right and left bead core 3a and 3b and bead fillers 8a and 8b. Two layers of steel belt 5 are arranged above the carcass ply 4a in a radial direction of the tire, and a tread rubber 3 is arranged in a tire road contact surface portion provided above the steel belts 5. Further, side wall rubbers 2a and 2b are arranged on the carcass layer of both sides of the tread rubber 3.

Figure 9A:
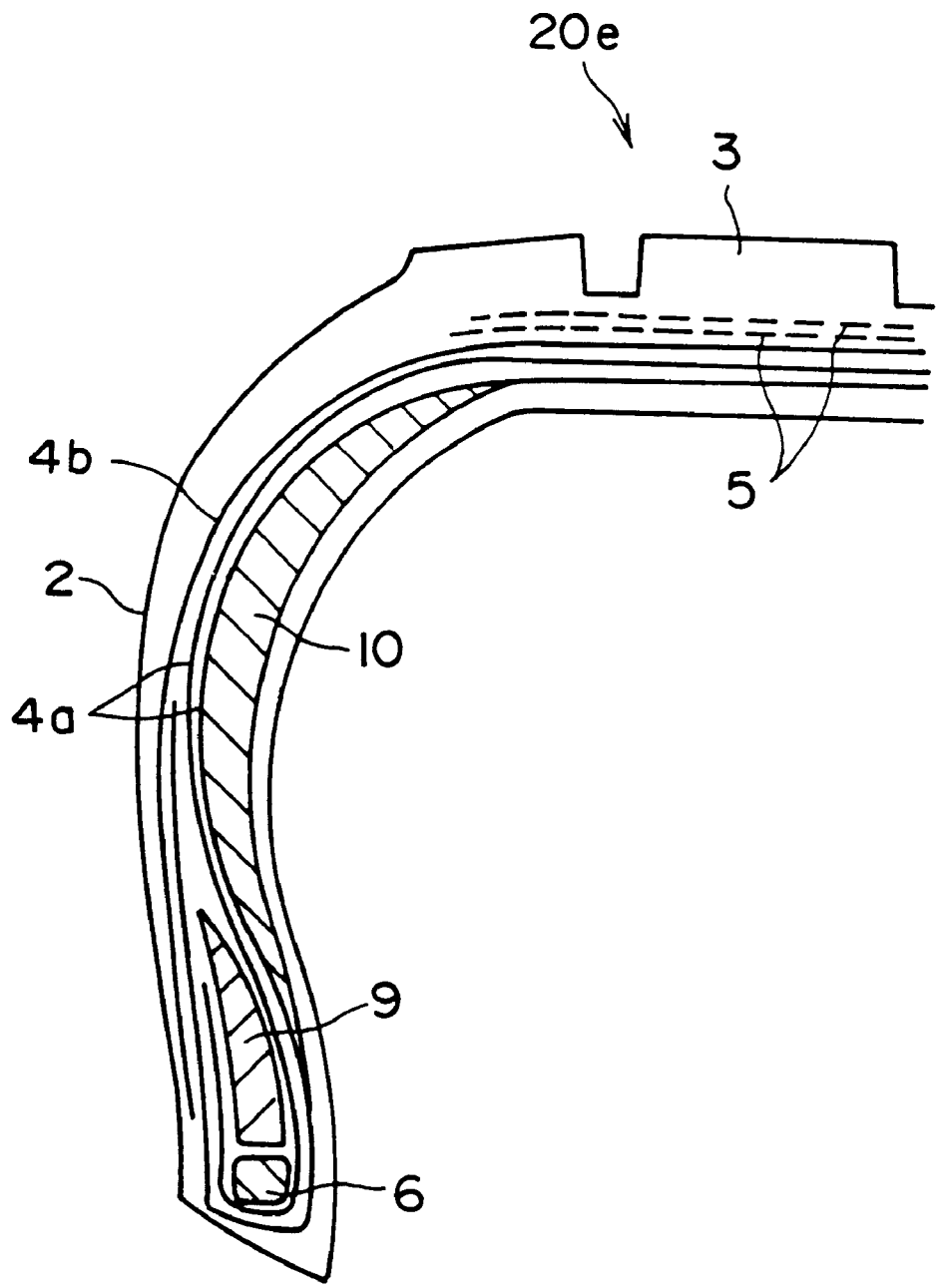
FIG. 9A is an explanatory view which shows an outline of the disposition of each member in a tire side portion of the pneumatic tire used for a example of the fourth embodiment and corresponding comparative examples.
Figure 9C:
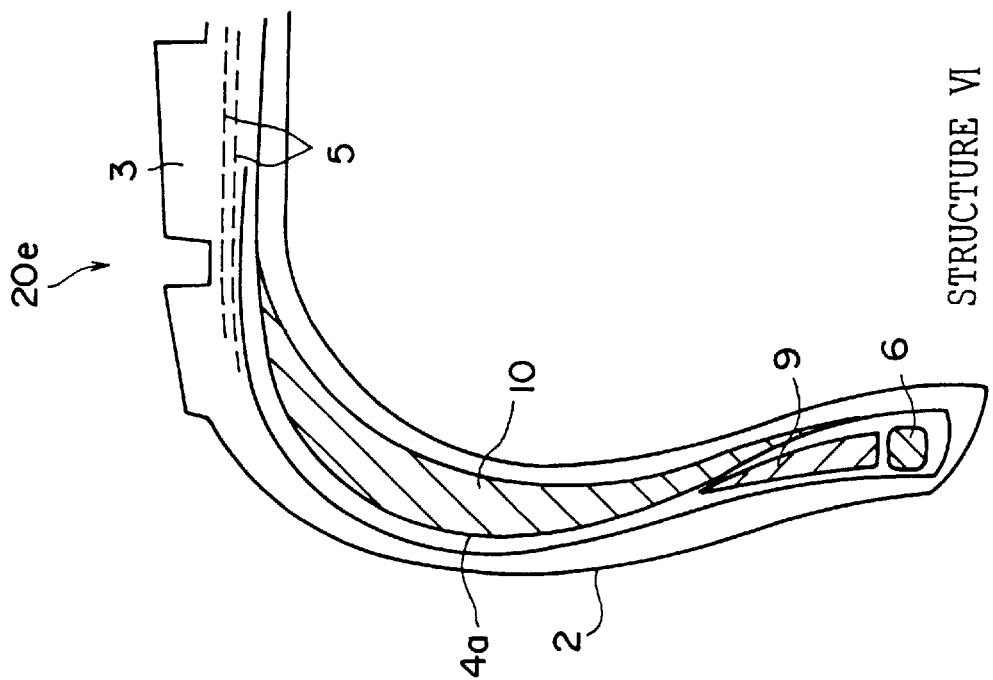
FIG. 9C is an explanatory view which shows a further outline of the disposition of each member in a tire side portion (a carcass portion) of the pneumatic tire used for an example of the fourth embodiment and corresponding comparative examples.
Figure 9B:
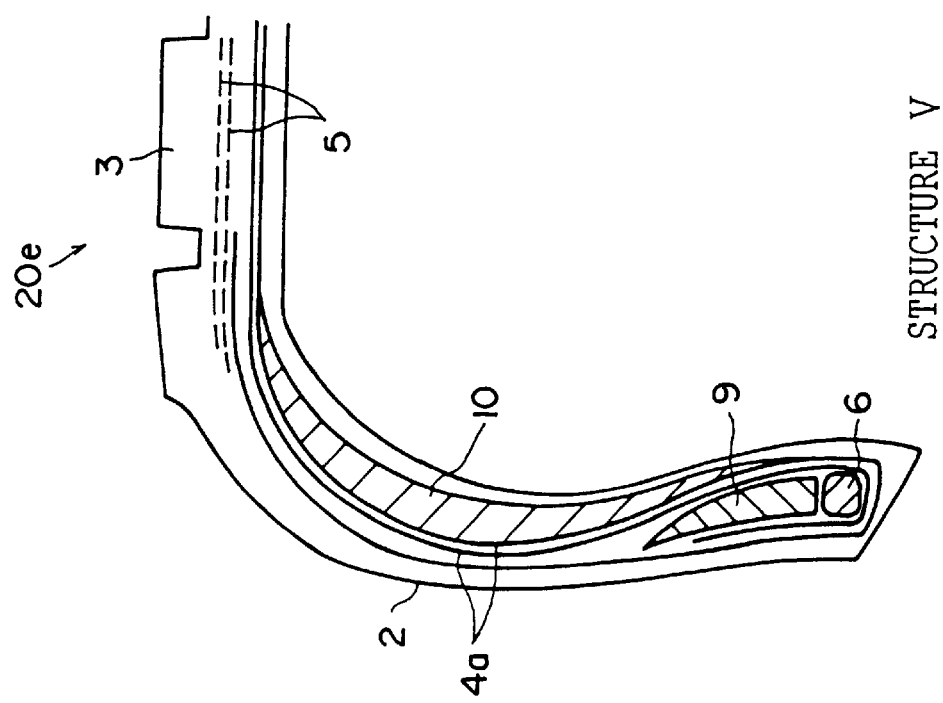
FIG. 9B is an explanatory view which shows another outline of the disposition of each member in a tire side portion (a carcass portion) of the pneumatic tire used for an example of the fourth embodiment and corresponding comparative examples.

An arrangement of the carcass portion in the tire side portion of the pneumatic safe tire in the present embodiment is exemplified in structures IV, V and VI in FIGS. 9A, 9B and 9C.

In the structure IV, in addition to the two turned up carcass ply 4a using steel cords, a reinforcing rubber layer 10 having a crescent cross section (for example, a maximum thickness 13 mm and a Shore hardness 80 degrees) is arranged inside the carcass ply 4a having a three plies carcass structure in which a sheet of down carcass 4b is arranged on the most front layer. In the structure V, a reinforcing rubber layer 9 having a crescent cross section is arranged inside the carcass ply 4 having a to plies carcass structure in which an end of the carcass ply 4a using a sheet of steel cord is turned up to the tread portion enveloped structure. In the structure IV, the reinforcing rubber layer 9 is arranged inside the carcass ply 4 having a 1P carcass portion in which a turned up ply forms an enveloped structure.

A structure of the carcass portion used as a control is the same as that of the structure I except that the carcass ply using the PET is employed in place of the carcass ply using the steel cord. The PET cord used for this comparative examples is the cord obtained by cable twisting two ply twisted yarns of 1670 dtex (1670 dtex/2).

EXAMPLES 41 to 44

Comparative Example 1

The compounding recipe of a rubber composition for the carcass ply matrix rubber and the reinforcing rubber layer may be that shown in Table 1 (that is, the composition may be basically the same as in the first embodiment). Various elements of the carcass ply cord and the structure of the carcass portion are shown in Table 12. It should be noted, in the tires of the examples and the comparative examples of the present embodiment, the rubber composition of the coating rubber used for the steel cord reinforced-belt layer (and belt reinforcing layers) may be that shown in Table 2 (that is, the composition may be basically the same as in the first embodiment).

The run flat durability and the durability at a time of charging the internal pressure of the tire were measured by using a tire having the aforementioned composition and a tire size 225/60 R16. The results are shown in Table 12.

As shown in Table 12, in the pneumatic run flat tire of the present embodiment, the run flat running performance is widely improved while maintaining the excellent performance such as the high durability during the "normal" running in which the tires have been charged at the normal internal pressure.

On the contrary, in the case of the pneumatic run flat tire using PET as the carcass ply cord (a comparative example 41), the run flat durability is significantly deteriorated.

As mentioned above, in the pneumatic run flat tire of the present embodiment, by using the carcass ply using the specific steel cord, there is obtained an advantage that the run flat running performance can be widely improved while maintaining the excellent performance during the normal running in which the tires have been charged at the normal internal pressure.

Next, a modified example of the present embodiment will be described below.

This modified example is basically the same as the fourth embodiment mentioned above, however, its unique feature is characterized in that at least one sheet of rubber-filament fiber composite having a specific size and composition is arranged in the side wall portion.

Figure 10A:
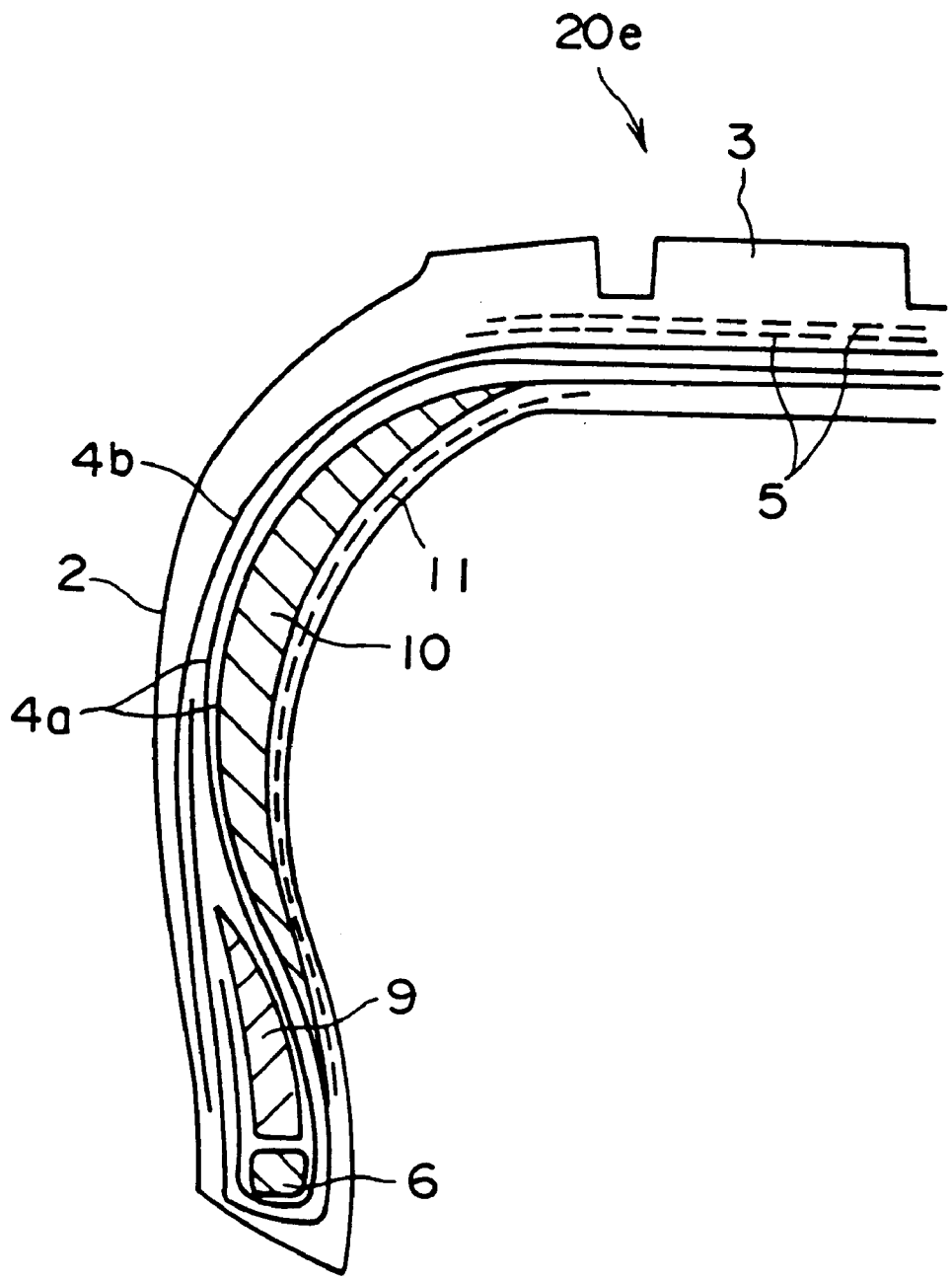
FIG. 10A is an explanatory view which shows an outline of the disposition of each member in the carcass portion of a modified example of the fourth embodiment.
Figure 10C:
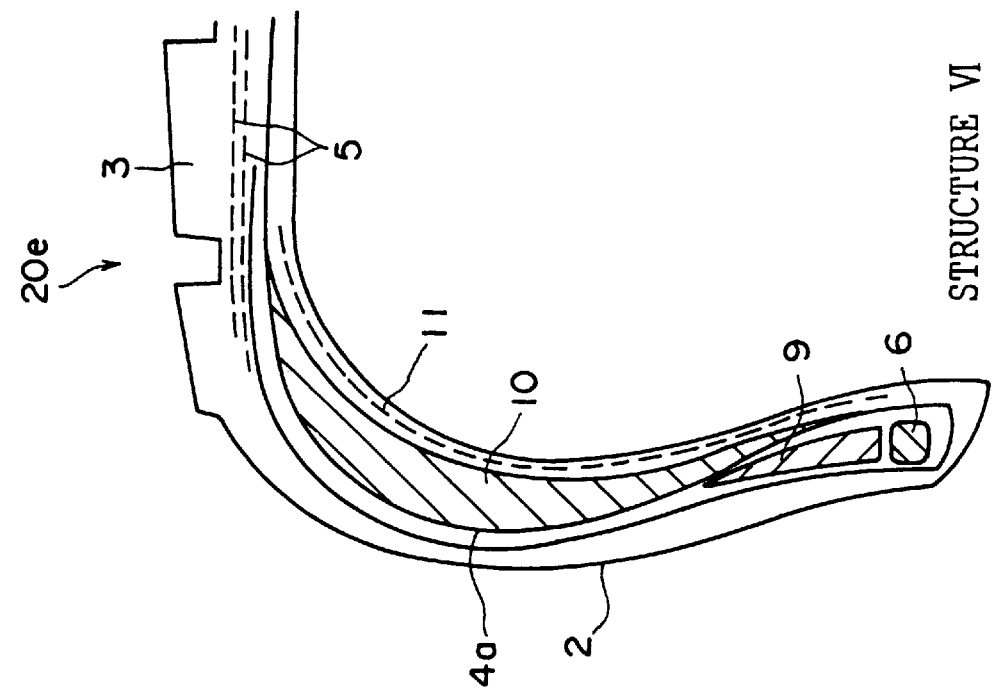
FIG. 10C is an explanatory view which shows a further outline of the disposition of each member in the carcass portion of a modified example of the fourth embodiment.
Figure 10B:
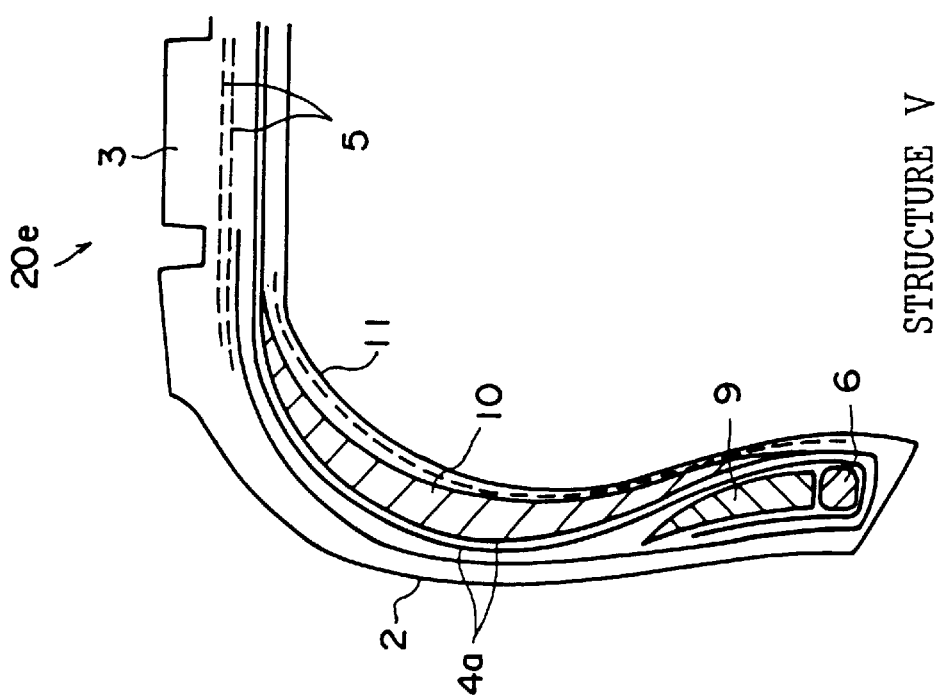
FIG. 10B is an explanatory view which shows another outline of the disposition of each member in the carcass portion of a modified example of the fourth embodiment.

That is, in this modified example, the rubber reinforcing layer 10 having a crescent cross section is arranged inside the carcass ply 4 of the side wall 2 of the fourth embodiment (refer to FIG. 10), and at least one sheet of rubber-filament fiber composite 11 having a thickness 0.05 to 2.0 mm and comprising a filament fiber having a diameter (or a maximum diameter) of 0.0001 to 0.1 mm and a length of 8 mm or more and a rubber component is also arranged in the side wall portion.

In this modified example, it is preferable that the rubber-filament fiber composite 11 contains 4 to 50% by weight of filament fiber. Further, it is preferable that the rubber-filament fiber composite 11 comprises a non-woven fabric having a weight /m$^2$ 10 to 300 g/m$^2$ and the matrix rubber composition. In addition, a sheet of down carcass layer may be further arranged between the side wall portion 7 and the outer surface of the turned up carcass ply 4.

In the present modified example, the filament fiber used for the rubber-filament fiber composite 11 as the fiber reinforcing member layer is different from a cord fabric in the fiber cord for the tire, and is not structured such that a

TABLE 12

| | COMPARATIVE EXAMPLE 41 | EXAMPLE 41 | EXAMPLE 42 | EXAMPLE 43 | EXAMPLE 44 |
|---|---|---|---|---|---|
| CARCASS PLY CORD | | | | | |
| MATERIAL | PET | STEEL | STEEL | STEEL | STEEL |
| STRUCTURE | 1670/2[1] | 1 × 3 | 1 × 5 | 1 × 5 | 1 × 5 |
| DIAMETER (mm) | — | 0.20 | 0.15 | 0.15 | 0.15 |
| LOAD AT BREAKING (N) | 220 | 240 | 240 | 240 | 240 |
| DUCTILITY BEFORE BREAKING (%) | 14.5 | 8.5 | 8.5 | 8.5 | 8.5 |
| ARRANGEMENT STRUCTURE OF | STRUCTURE I | STRUCTURE I | STRUCTURE I | STRUCTURE II | STRUCTURE II |
| CARCASS PORTION (FIG. 2) | 3P STRUCTURE | 3P STRUCTURE | 3P STRUCTURE | 2P STRUCTURE | IP STRUCTURE |
| PERFORMANGE OF TIRE | | | | | |
| RUN FLAT DURABILITY (INDEX) | 100 | 278 | 361 | 267 | 139 |
| DURABILITY AT A TIME OF CHARGING INTERNAL PRESSURE | O | O | O | O | O |

[1]1670 DTEX/2 plurality of fiber bundles are plied or woven. In short, the non-woven fabric is preferably used as the filament fiber.

As a material for the filament fiber constituting the rubber-filament fiber composite, one type or a plural types of fibers may be used. Such fibers may include: a natural polymeric fiber such as cotton, rayon, cellulose and the like, a synthetic polymeric fiber such as an aliphatic polyamide, a polyester, a polyvinyl alcohol, a polyimide, an aromatic polyamide and the like, a carbon fiber, a glass fiber, a steel wire. However, in view of a dimensional stability at a high temperature, an aromatic polyamide, a rayon, a polyethylene naphthalate, a polyimide, a carbon fiber, a glass fiber and a steel wire are preferable. As a concrete example of the aromatic polyamide fiber, apolyparaphenylene terephthal amide, a polymethaphenylene terephthal amide, a polyparaphenylene isophthal amide, a polymethaphenylene isophthal amide and the like can be exemplified.

The diameter or the maximum diameter of the fiber applied to the rubber-filament fiber composition must be within a range between 0.0001 and 0.1 mm, and preferably 0.0001 to 0.005 mm. Further, a length of the fiber used for the rubber-filament fiber complex must be 8 mm or more, preferably 10 mm or more. When the length of the fiber is short, sufficient twining between the filament fibers may not be achieved, and thus the strength required as the reinforcing layer may not be maintained.

Either of the fibers having a circular cross section, and one having a non-circular cross section may be employed. Or, the fiber may be hollowed. Further, a core-sheath structure in which different materials are arranged in an inner layer and an outer layer, or a fiber having a cross section of a star shape, a petal shape, a layer shape and the like can be employed.

It is preferable that the filament fiber is contained in the rubber-filament fiber composite by 4 to 50% by weight. When the rate of the filament fiber in the complex is less than 4% by weight, a uniformity in the complex can not be maintained and a rigidity as the reinforcing layer may not be reliably achieved. When the rate is more than 50% by weight, it is not preferable, either, since the rate of the fiber continuous layer is increased in the rubber-filament fiber complex, thus a durability of the rubber-filament fiber composite is lowered, and as a resent the durability for the tire tends to be lowered.

In the rubber-filament fiber composite used for the pneumatic tire for the passenger cars of this modified example, it is preferable to employ a non-woven fabric.

As a method of manufacturing the non-woven fabric, a needle punch method, a carding method, a melt blow method, a span bond method and the like are suitable. Among these manufacturing methods, a carding method in which filaments are crossed and twined by a water stream or a needle and a span bond method in which filaments are bonded to each other are particularly suitable for obtaining the non-woven fabric used in the present embodiment.

It is preferable that a weight (weight per 1 m$^2$) of the non-woven fabric is within a range between 10 and 300g/m$^2$. When the weight is more than 300 g per 1 m$^2$, there is a possibility that the gap within the non-woven fabric can not be impregnated with the matrix rubber composition, depending on the fluidity of the rubber composition, which is not preferable in terms the peeling-off-resistance characteristics of the rubber-non-woven fabric composite, especially when used as a tire member. When the weight is less than 10 g, it is not preferable, either, since it is hard to maintain a uniformity of the non-woven fabric itself, the non-woven fabric becomes uneven, and strength, rigidity and ductility before breaking as vulcanized rubber-non-woven fabric composite tend to sharply vary among the products.

It is preferable that a thickness of the non-woven fabric measured under 20 g/cm$^2$ pressure is within a range between 0.05 and 2.0 mm, and more preferably between 0.1 and 0.5. When the thickness is less than 0.05, it is hard to maintain a uniformity of the non-woven fabric, and a strength and a rigidity as the rubber-non-woven fabric composite is insufficient. When the thickness is more than 2.0 mm, a gauge becomes thick when combined with the matrix rubber composition, and thus it is not preferable as a tire member.

The rubber composition and the filament fiber are combined as a composite by applying a non-vulcanized rubber composition to the filament fiber at a stage when the member has not yet been vulcanized. More specifically, a mixing can be performed by using a mixing machine conventionally used in a rubber industry such as a roll, a ban bury mixer and the like. In order to disperse the fiber well, it is preferable to charge the filament fiber little by little. In the case of using the non-woven fabric as the filament fiber, a sheet-shaped non-vulcanized rubber composition is pressure attached to the non-woven fabric from both upper and lower surfaces or from one surface by a press, a heat roll or the like. As a result, an air within the non-woven fabric is well substituted with the non-vulcanized rubber composition. Depending on the fluidity of the non-vulcanized rubber composition, it may be necessary to perform the press-attachment under a elevated temperature in which a vulcanization reaction is not substantially started. Further, as another method, the non-vulcanized rubber composition may be liquefied by using a solvent and the liquefied rubber composition may be applied to the non-woven fabric such that tackiness can be obtained.

Further, at a time of preparing the rubber/filament fiber composition, if a bonding of the filament fiber to the matrix rubber composition is excellent after vulcanization, the preparatory bonding treatment to the filament fiber may be omitted. When the bonding is insufficient, the similar dipping heat set treatment as used for increasing bonding force between the fiber cord for the tire and the rubber may be applied to the filament fiber.

With respect to physical properties of the rubber composition used for the composite member, it is desirable that a tensile stress at a time of 50% extension (M50) is 2.0 to 9.0 Mpa, and a tensile stress at a time of 100% extension (M100) is 4.0 to 15.0 Mpa.

The other structure is basically the same as that of the fourth embodiment mentioned above, thus the explanation thereof is omitted.

In summary, according to this modified example, the run flat durability is further improved by arranging at least one sheet of rubber-filament fiber composite in the side wall portion together with the rubber reinforcing layer having a crescent cross section provided on the inner surface and/or the outer surface of the carcass layer using the steel cord.

A tensile stress of the rubber composition used was measured in accordance with JIS K6301-1995.

A performance of the tire is measured in accordance with the following method.

(1) Run Flat Durability

In this case, the comparative examples 1, 2 and 3 respectively represent a control for the examples 1 to 3, the example 4 and the example 5.

(2) Durability During Normal Running

The tire having a size 225/60 R16 and including the reinforcing rubber layer having a crescent cross section provided inside the carcass ply of the side wall portion was formed by the conventional method.

A compound recipe of the rubber composition of the reinforcing rubber layer is shown in Table 13.

M50 is 4.5 and M100 is 10.5.

TABLE 13

|  | (WEIGHT PORTION) |
| --- | --- |
| NATURAL RUBBER | 30.0 |
| BUTADIENE RUBBER*[1] | 70.0 |
| CARBON BLACK*[2] | 60.0 |
| SOFTENING AGENT[3] | 5.0 |
| ZINC OXIDE | 3.0 |
| STEARIC ACID | 1.0 |
| VULCANIZATION ACCELERATOR*[4] | 3.5 |
| ANTIOXIDANT*[5] | 2.0 |
| SULFUR | 5.0 |

*[1]BR01 (TRADE NAME; MANUFACTURED BY JSR CO., LTD.)
*[2]FEF
*[3]SPINDLE OIL
*[4]NOCCELER NS (TRADE NAME, MANUFACTURED BY OUCHI SHINKO CHEMICAL INDUSTRIES CO., LTD.)
*[5]NOCRAC 6C (TRADE NAME, MANUFACTURED BY OUCHI SHINKO CHEMICAL INDUSTRIES CO., LTD.)
M50 = 4.5MPa
M100 = 10.5MPa

The rubber-filament fiber composite was prepared by using a ban bury mixer in the case that the non-woven fabric was not used as the filament fiber, and by pressure attaching the sheet-shaped non-vulcanized rubber composition to the non-woven fabric from both upper and lower surfaces or one surface by means of a press at 70° C. in the case that the non-woven fabric was used.

The used rubber composition was the same as the reinforcing rubber layer.

The structure of the carcass may be selected from the following three types.

Structure IV(Refer to FIG. 10A): three plies structure similar to that of FIG. 9A in which, in addition to two turned carcass layers, a sheet of down carcass layer is provided at the outer side of the turned up carcass layers and a rubber-filament fiber composition 11 is provided on the inner side of a reinforcing rubber layer 10 having a crescent-shaped cross section.

Structure V (Refer to FIG. 10B): two plies structure similar to that of FIG. 9B in which, in addition to one turned up carcass layer, another carcass layer is provided with its end turned up to the tread portion, and a rubber-filament fiber composition 11 is provided on the inner side of a reinforcing rubber layer 10 having a crescent-shaped cross section.

Structure VI (Refer to FIG. 10C): one ply structure similar to that of FIG. 9C in which, one carcass layer is provided with its end turned up to the tread portion, and a rubber-filament fiber composite 11 is provided on the inner side of a reinforcing rubber layer 10 having a crescent-shaped cross section.

The structure-related data of the respective tires are shown in Table 14.

TABLE 14

|  | COMPARATIVE EXAMPLE 51 | EXAMPLE 51 | EXAMPLE 52 | EXAMPLE 53 | COMPARATIVE EXAMPLE 52 | EXAMPLE 54 | COMPARATIVE EXAMPLE 3 | EXAMPLE 5 |
| --- | --- | --- | --- | --- | --- | --- | --- | --- |
| REINFORCING MEMBER |  |  |  |  |  |  |  |  |
| REINFORCING RUBBER LAYER COMPOSITE | O | O | O | O | O | O | O | O |
| NON-WOVEN FABRIC |  | O | O |  |  | O |  | O |
| FILAMENT FIBER |  |  |  | O |  |  |  |  |
| KIND OF FIBER | — | ARAMID | ARAMID | ARMID | — | ARAMID | — | ARAMID |
| LENGTH OF FIBER (mm) | — | 50 | 50 | 50 | — | 50 | — | 50 |
| DIAMETER OF FIBER (mm) | — | 0.02 | 0.02 | 0.02 | — | 0.02 | — | 0.02 |
| WEIGHT | — | 50 | 50 | — | — | 50 | — | 50 |
| CARCASS PLY CORD |  |  |  |  |  |  |  |  |
| MATERIAL | STEEL | STEEL | STEEL | STEEL | STEEI | STEEL | STEEL | STEEL |
| STRUCTURE | 1 × 5 | 1 × 3 | 1 × 5 | 1 × 5 | 1 × 5 | 1 × 5 | 1 × 5 | 1 × 5 |
| DIAMETER OF FILAMEMT (mm) | 0.15 | 0.20 | 0.15 | 0.15 | 0.15 | 0.15 | 0.15 | 0.15 |
| LOAD AT BREAKING (N/CORD) | 240 | 240 | 240 | 240 | 240 | 240 | 240 | 240 |
| DUCTILITY BEFORE BREAKING (%) | 8.5 | 8.5 | 8.5 | 8.5 | 8.5 | 8.5 | 8.5 | 8.5 |
| STRUCTURE | 3P STRUCTURE | 3P STRUCTURE | 3P STRUCTURE | 3P STRUCTURE | 2P STRUCTURE | 2P STRUCTURE | 1P STRUCTURE | 1P STRUCTURE |
| TIRE STRUCTURE | STRUCTURE I | STRUCTURE II | STRUCTURE II | STRUCTURE II | STRUCTURE III | STRUCTURE IV | STRUCTURE V | STRUCTURE VI |

TABLE 14-continued

| | COMPARATIVE EXAMPLE 51 | EXAMPLE 51 | EXAMPLE 52 | EXAMPLE 53 | COMPARATIVE EXAMPLE 52 | EXAMPLE 54 | COMPARATIVE EXAMPLE 3 | EXAMPLE 5 |
|---|---|---|---|---|---|---|---|---|
| RUN FLAT DURABILITY (INDEX) | 100 | 125 | 130 | 130 | 100 | 135 | 100 | 135 |
| DURABILITY AT A TIME OF CHARGING INTERNAL PRESSURE | O | O | O | O | O | O | O | O |

O IN REINFORCING MEMBER SPACE MEANS THAT THE MEMBER IS INCLUDED.

It is understood that the durability of the tire can be improved by arranging the rubber-filament fiber composite in the side wall in any structure type of the carcass ply. As mentioned above, a pneumatic tire for passenger cars having excellent durability are provided in which bonded layers do not get separated at the interface even during a run-flat running.

What is claimed is:

1. A pneumatic tire for a passenger car, comprising:
    a pair of bead portions;
    a toroidal carcass layer extending over both bead portions;
    at least two belt layers provided in a crown portion of said carcass layer;
    a tread portion positioned at an outer peripheral side of said at least two belt layers;
    side wall portions provided at the right and left sides of said tread portion; and
    a steel cord serving as a reinforcing material for reinforcing at least one layer selected from said carcass layer and said at least two belt layers,
    wherein said steel cord is formed by plying a plurality of filaments each having a diameter of 0.125 to 0.275 mm, has an inflection point on a stress-strain curve thereof within a range of over 1% of extension rate, and the reduction rate of the diameter of said steel cord, which is a rate of the diameter of the cord under a load stress one third of the tensile stress at breaking to the diameter of the cord under no load stress, is equal to or more than 20%.

2. A pneumatic tire for a passenger car according to claim 1, wherein the reduction rate of the diameter of said steel cord is equal to or more than 30%.

3. A pneumatic tire for a passenger car according to claim 1, wherein the reduction rate of the diameter of said steel cord is equal to or more than 45%.

4. A pneumatic tire for a passenger car according to claim 1, further comprising at least one belt reinforcing layer provided outside said at least two belt layers, wherein said at least one belt reinforcing layer is wound around said at least two belt layers in a spiral and endless manner substantially in parallel to the peripheral direction of the tire, and said at least one belt reinforcing layer is disposed across the entire length of the at least two belt layers and/or at both end portions of the at least two belt layers.

5. A pneumatic tire for a passenger car according to claim 4, wherein said at least one belt reinforcing layer includes said steel cord.

6. A pneumatic tire for a passenger car according to claim 1, wherein the construction of said steel cord is a single layer construction of 1×n, wherein $2 \leq n \leq 7$.

7. A pneumatic tire for a passenger car according to claim 1, wherein said steel cord is used as a reinforcing material in the carcass layer.

8. A pneumatic tire for a passenger car according to claim 1, wherein said pneumatic tire is a run flat tire.

9. A pneumatic tire for a passenger car according to claim 1, wherein said pneumatic tire is a run flat tire having a reinforcing rubber layer which has a crescent shaped cross section and is provided on an inner peripheral surface of the carcass layer in the side wall portions.

10. A pneumatic tire for a passenger car, comprising:
    a pair of bead portions;
    a toroidal carcass layer extending over both bead portions;
    at least two belt layers provided in a crown portion of said carcass layer;
    a tread portion positioned at an outer peripheral side of said at least two belt layers; and
    side wall portions provided at the right and left sides of said tread portion,
    wherein said carcass layer comprises a steel cord and at least one of said at least two belt layers comprises a steel cord, wherein each steel cord is formed by plying a plurality of filaments each having a diameter of 0.125 to 0.275 mm, each steel cord has an inflection point on a stress-strain curve thereof within a range of over 1% of extension rate, and the diameter reduction rate of said steel cord, which is a rate of the diameter of the cord under a load stress one third of the breaking strength to the diameter of the cord under no load stress, is equal to or more than 35%.

11. A pneumatic tire for a passenger car according to claim 10, further comprising at least one belt reinforcing layer provided outside said at least two belt layers, wherein said at least one belt reinforcing layer is wound around said at least two belt layers in a spiral and endless manner substantially in parallel to the peripheral direction of the tire, and said at least one belt reinforcing layer is disposed across the entire length of the at least two belt layers and/or at both end portions of the at least two belt layers.

12. A pneumatic tire for a passenger car according to claim 10, wherein said pneumatic tire is a run flat tire.

13. A pneumatic tire for a passenger car according to claim 10, wherein said pneumatic tire is a run flat tire having a reinforcing rubber layer which has a crescent shaped cross section and is provided on an inner peripheral surface of the carcass layer in the side wall portions.

14. A pneumatic safety tire for a passenger car according to claim 13, further comprising at least one down carcass portion disposed between said side wall portions and the outer surface of said carcass layer.

* * * * *

(12) EX PARTE REEXAMINATION CERTIFICATE (5103rd)
United States Patent
Oshima et al.

(10) Number: US 6,186,205 C1
(45) Certificate Issued: Apr. 26, 2005

(54) PNEUMATIC TIRE FOR PASSENGER CARS INCLUDING SPECIFIED STEEL CORD

(75) Inventors: Kazuo Oshima, Tokyo (JP); Kozo Sasaki, Tokyo (JP); Tomohisa Nishikawa, Tokyo (JP); Kazuomi Kobayashi, Tokyo (JP); Kenji Matsuo, Tokyo (JP)

(73) Assignee: Bridgestone Corporation, Tokyo (JP)

Reexamination Request:
No. 90/006,302, May 29, 2002

Reexamination Certificate for:
Patent No.: 6,186,205
Issued: Feb. 13, 2001
Appl. No.: 09/193,721
Filed: Nov. 17, 1998

(30) Foreign Application Priority Data

| Nov. 17, 1997 | (JP) | 9-315088 |
| Nov. 27, 1997 | (JP) | 9-326143 |
| Dec. 22, 1997 | (JP) | 9-353767 |
| Jun. 10, 1998 | (JP) | 10-162644 |
| Jun. 19, 1998 | (JP) | 10-172912 |

(51) Int. Cl.$^7$ .............. B60C 9/00; B60C 9/04; B60C 9/20; B60C 9/22; B60C 17/00
(52) U.S. Cl. .............. 152/517; 57/902; 152/527; 152/531; 152/553; 152/556
(58) Field of Search .............. 152/517, 451, 152/527, 531, 533, 556, 553, 516; 57/902; 156/117

(56) References Cited

U.S. PATENT DOCUMENTS

| 3,996,020 A | 12/1976 | Hosoya |
| 4,140,168 A * | 2/1979 | Caretta ............ 152/531 |
| 4,169,495 A * | 10/1979 | Maiocchi ............ 152/531 |
| 4,258,543 A | 3/1981 | Canevari et al. |
| 4,333,306 A | 6/1982 | Yamashita et al. |
| 4,836,262 A | 6/1989 | Nishizawa et al. |

FOREIGN PATENT DOCUMENTS

| EP | 335588 A2 * | 10/1989 |
| EP | 0 456 437 A2 | 11/1991 |

OTHER PUBLICATIONS

English language abstract for JP 08–164703, Patent Abstracts of Japan.

* cited by examiner

Primary Examiner—Geoffrey L. Knable

(57) ABSTRACT

A pneumatic tire for a passenger car having a pair of bead portions, a toroidal carcass portion extending over both bead portions, at least two belt layers provided in a crown portion of the carcass, a tread portion positioned at an outer peripheral side of the belt layer, and side wall portions provided at the right and left sides of the tread portion, and which further includes a steel cord as a reinforcing material for reinforcing at least one layer of the carcass portion and the belt layer. The steel cord is formed by plying a plurality of filaments each having a strand diameter of 0.125 to 0.275 mm, and has an inflection point on an S—S curve. A reduction rate of a diameter of the steel cord under a load stress which is one third of breaking strength in comparison with a no load condition is equal to or more than 20%.

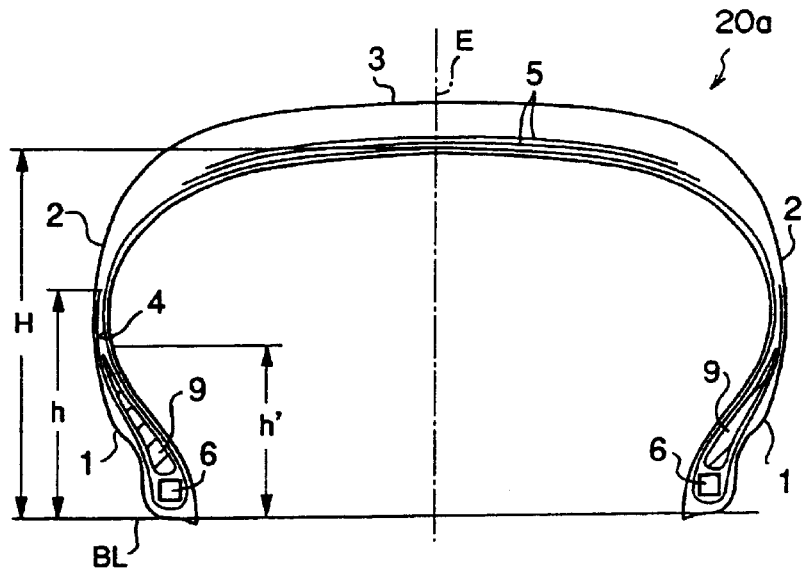

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–14 are cancelled.

* * * * *